(12) United States Patent
Kolze et al.

(10) Patent No.: US 7,366,258 B2
(45) Date of Patent: Apr. 29, 2008

(54) CHIP BLANKING AND PROCESSING IN SCDMA TO MITIGATE IMPULSE AND BURST NOISE AND/OR DISTORTION

(75) Inventors: Thomas J. Kolze, Phoenix, AZ (US); Nabil R. Yousef, Foothill Ranch, CA (US); Jonathan S. Min, Fullerton, CA (US)

(73) Assignee: Broadcom Corporation, Irvine, CA (US)

( * ) Notice: Subject to any disclaimer, the term of this patent is extended or adjusted under 35 U.S.C. 154(b) by 759 days.

(21) Appl. No.: 10/962,803

(22) Filed: Oct. 12, 2004

(65) Prior Publication Data

US 2005/0047489 A1 Mar. 3, 2005

Related U.S. Application Data

(63) Continuation-in-part of application No. 10/136,059, filed on Apr. 30, 2002, now Pat. No. 7,236,545.

(60) Provisional application No. 60/296,884, filed on Jun. 8, 2001.

(51) Int. Cl.
*H04L 27/06* (2006.01)
(52) U.S. Cl. .................................... 375/340
(58) Field of Classification Search ................ 375/147, 375/150, 340, 342, 343, 285, 149
See application file for complete search history.

(56) References Cited

U.S. PATENT DOCUMENTS 5,638,362 A * 6/1997 Dohi et al. ................. 370/342
6,122,332 A * 9/2000 Ogata et al. ................. 375/346
6,141,373 A * 10/2000 Scott .......................... 375/150
6,154,486 A * 11/2000 Scott et al. .................. 375/142
6,345,073 B1 * 2/2002 Curry et al. ................. 375/265
6,920,194 B2 * 7/2005 Stopler et al. ............... 375/349

OTHER PUBLICATIONS

Marco Lops, Member, IEEE, Giuseppe Ricce and Antonia Maria Tulino; Narrow-Band-Interface Suppression in Multiuser CDMA Systems; IEEE Transactions on Communications, vol. 46, No. 9, Sep. 1998; pp. 1163-1175.

Jeffrey A. Young, Member, IEEE, and James S. Lehnert, Senior Member, IEEE; Analysis of DFT-Based Frequency Excision Algorithms for Direct-Sequence Spread-Spectrum Communications; IEEE Transactions on Communications, vol. 46, No. 8, Aug. 1998, pp. 1076-1087.

\* cited by examiner

*Primary Examiner*—Khanh C. Tran
(74) *Attorney, Agent, or Firm*—Garlick Harrison & Markison; Bruce E. Garlick

(57) ABSTRACT

A system for mitigating impairment in a communication system includes a delay block, a signal level block, a moving average window block, an impulse noise detection block, and a combiner. The delay block receives and delays each chip of a plurality of chips in a spreading interval. The signal level block determines a signal level of each chip of the plurality of chips in the spreading interval. The moving average window block determines a composite signal level for a chip window corresponding to the chip. The impulse noise detection block receives the signal level, receives the composite signal level, and produces an erasure indication for each chip of the plurality of chips of the corresponding chip window. The combiner erases chips of the plurality of chips of the spreading interval based upon the erasure indication.

24 Claims, 22 Drawing Sheets

CHIP BLANKING AND PROCESSING IN SCDMA TO MITIGATE IMPULSE AND BURST NOISE AND/OR DISTORTION

CROSS-REFERENCE TO RELATED APPLICATIONS

This application is a continuation-in-part of application Ser. No. 10/136,059 filed Apr. 30, 2002, which became an U.S. Pat. No. 7,236,545, which claims benefit of and priority from, Provisional Application No. 60/296,884 filed Jun. 8, 2001, titled "Detection and Mitigation of Temporary Impairments in a Communications Channel", the complete subject matter of each of which is incorporated herein by reference in its entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

The present invention relates to communications systems, all of which are inherently limited in their capacity (or rate) of information transfer by channel impairments. More specifically, the present invention relates to information transfer between a plurality of Cable Modems (alternatively referred to as "CM") and a Cable Termination System (alternatively referred to as "CMTS" or "headend").

Communication systems are subjected to impairments, generally of a brief or transitory duration. One example of such impairment is often referred to by the generic term "noise". Noise sometimes emanates for example, from within electrical components themselves, such as amplifiers and even passive resistors. Another example of such impairment is referred to as "interference", which is usually taken to be some unwanted manmade emission, from another communications system such as radio or from switching circuits in a home or automobile for example. "Distortion" is a yet another example of such impairment, and includes linear distortion in the channel, such as pass-band ripple or non-flat group delay for example, and nonlinear distortion, such as compression in an overdriven amplifier for example. It is contemplated that there are many other types of impairments that may also adversely affect communications in a channel.

Often, such impairments may by dynamic in nature. In many cases, the impairment may be at one level of severity most of the time. In this instance, the communications system may be designed or optimized in some fashion to operate at that specific level of impairment. Occasionally, however, one or more of impairments may become so severe as to preclude the operation of such communications system optimized for the more ordinary level of impairments.

Previously, when a large interference or burst of noise occasionally impinges upon the receiver (a CM for example), it is known to simply blank out the received signal to mitigate such large out-of-the ordinary bursts of received power. Often, analog processing means are used, almost at, if not right at, the receiver input. This may be done especially to protect CM's or other sensitive receiver front-ends from damage. While this technique may provide some benefit in circumstances where the noise or interference power dwarfs the signal-of-interest power, it does not protect against the many other impairments that have power more on the order of the signal-of-interest power (or even much less). Thus blanking does not, by itself, provide the receiver with a means to improve its overall performance in the presence of the lost information, i.e., the information content concurrent with the large noise burst.

One known technique, a forward error correction technique (alternatively referred to as "FEC") has been applied, even unknowingly, to solve this problem. FEC techniques incorporate soft-decision decoding, such as is common with convolutional error correction codes and the Viterbi decoding algorithm. In such correction techniques, as the error power in the received signal increases, such increase is passed directly into the decision process.

Such encoding and decoding techniques have been in common practice for years, and are widely applied without thought to temporary fidelity changes in the channel. Fortunately, in the event of a change in the channel fidelity, the soft-decision decoding takes into consideration the larger error power in making signal decisions. However, unfortunately, often with a change in channel conditions, there is duration of multiple symbol intervals (in a digital communications system example) where the degradation persists. During this time some symbols may be so severely erred that they actually appear close to another possible (but wrong or incorrect) symbol. In such event, the soft-decision decoder actually "thinks" it has received a low error power, and may rate the wrong signal with a high confidence. This becomes much more likely as the constellation density (of a QAM constellation for example) is increased for high rate communications, Additional techniques, such as a Time Division Multiple Access technique (alternatively referred to as "TDMA") have been applied to solve this problem. In this technique, one or more carrier frequencies are shared among a plurality of CMs. Known standards, DOCSIS 1.0 and 1.1 for example, each of which are incorporated herein in their entirety, define the physical layer, and additional layers, in which a plurality of CMs transmit data upstream to and receive data downstream from the CMTS or headend. In this technique, each upstream carrier frequency or channel assignment is general shared by a plurality of CMs, each being granted time slots wherein they may use the channel. These grants are allocated and made known to the CMs via the downstream broadcast transmissions. Some of the grants only enable a single CM to transmit, while other time slot grants are in contention mode. That is some, or all, of the CMs may attempt to use the grant. However, if more than one CM attempts to use a grant in the contention mode, all the CMs will likely be unsuccessful in channel use.

Yet another technique, such as direct-sequence spread-spectrum modulation technique discussed by J. Young and J. Lehnert, in their paper titled "Analysis of DFT-Based Frequency Excision Algorithms for Direct-Sequence Spread-Spectrum Communications," IEEE Trans. Comm., vol. 46, pp. 1076-1087, August 1998, the complete subject matter of which is incorporated herein by reference in its entirety, has also been applied to solve this problem. In this technique, frequency excision is used to eliminate narrow-band energy, thus enhancing the capacity of direct-sequence spread-spectrum modulation to reject narrow-band interference. However, this disclosed technique focuses on particular waveforms having energy concentrated about a narrow band.

Yet still another technique, such as such as Code-Division Multiple Access technique (alternatively referred to as "CDMA") discussed by M. Lops, G. Ricci and A. Tulino, in their paper titled "Narrow-Band-Interference Suppression in Multiuser CDMA Systems," *IEEE Trans. Comm.,* vol. 46, pp. 1163-1175, September 1998, the complete subject matter of which is incorporated herein by reference in its entirety, has also been applied to solve this problem. In this technique, a decision is made regarding the bit(s) transmitted by each user over a communication system. This decision is based on the projection of the observables on to the orthogonal complement to the subspace spanned by the other users' signatures and the narrow-band interference. The disclosed technique recognizes that the blanking and iterative processing may be performed with an orthogonal basis set decomposition of the frequency domain.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

These and other advantages and novel features of the present invention, as well as details of an illustrated embodiment thereof, will be more fully understood from the following description and drawings in which a system for mitigating impairment in a communication system constructed according to the present invention is described. The system includes a delay block, a signal level block, a moving average window block, an impulse noise detection block, and a combiner. The delay block is operable to receive and delay each chip of a plurality of chips in a spreading interval. This spreading interval may have a duration of 128 chips, such as in an SCDMA system. However, the system may operate according with other spread spectrum or CDMA systems as well. Further, the system may operate across different spreading sequences whose boundaries are affected by an impairment.

The signal level block is operable to determine a signal level of each chip of the plurality of chips in the spreading interval. The moving average window block communicatively couples the signal level block and is operable to determine a composite signal level for a chip window corresponding to the chip. The impulse noise detection block communicatively couples to the signal level block and to the moving average window block. The impulse noise detection block is operable to receive the signal level of each chip of the plurality of chips and spreading interval, to receive the composite signal level corresponding to each chip of the plurality of chips, and to produce an erasure indication for each chip of the plurality of chips of the corresponding chip window. One purpose of the impulse noise detection block is to determine which chips of the plurality of chips in the spreading interval are impacted by impulse noise and resultantly are not indicative of the value of a spread symbol. After making this/these determination(s), the impulse noise detection block generates corresponding erasure indication(s). The combiner communicatively couples to the delay block and to the impulse noise detection block and is operable to erase chips of the plurality of chips of the spreading interval based upon the erasure indication.

The erased and kept chips are then passed to a despreader that despreads the chips across the spreading interval to produce a symbol for the spreading interval. Alternately, the chips may be covered with a corresponding orthogonal code prior to being received by the system and then linearly combined after the chip erasure/keeping operations of the system have been completed.

In determining the signal level of the chip, the signal level block may magnitude-square a measured level of each chip. In one embodiment, the impulse noise detection block is operable to, for each chip of the plurality of chips: (1) compare the signal level of the chip to a first threshold to produce a first comparison result; (2) compare the composite signal level corresponding to the chip to a second threshold to produce a second comparison result; and (3) produce the erasure indication based upon the first comparison result and the second comparison result In various embodiments, the first and second comparison result may be either separately used to indicate an erasure or combined to indicate an erasure.

The moving average window block operates to receive the signal level of each chip, e.g., receiving the magnitude-square of the measured level of each chip. The moving average window block sums the signal level of the plurality of chips in the chip window to produce a signal level summation result. The moving average window block then averages the signal level summation result across the chip window to produce a composite signal level of the plurality of chips of the corresponding chip window. With this embodiment, the impulse noise detection block may be operable to compare the composite signal level of the plurality of chips of the corresponding chip window to a third threshold to produce a third comparison result and to determine a fourth comparison result based upon third comparison results of adjacent chips. Further, with this embodiment, the impulse noise detection block is operable to produce the erasure indication based upon the fourth comparison result An additional operation includes producing the erasure indication by considering first comparison results and second comparison results of neighboring chips. These particular comparison results consider where the edge of the impulse noise impairment in the spreading interval occurs.

Still another embodiment includes a method of operation. In addition, other aspects, advantages, and novel features of the invention will become apparent from the following detailed description of the invention when considered in conjunction with the accompanying drawings.

DETAILED DESCRIPTION OF THE INVENTION

Figure 1:
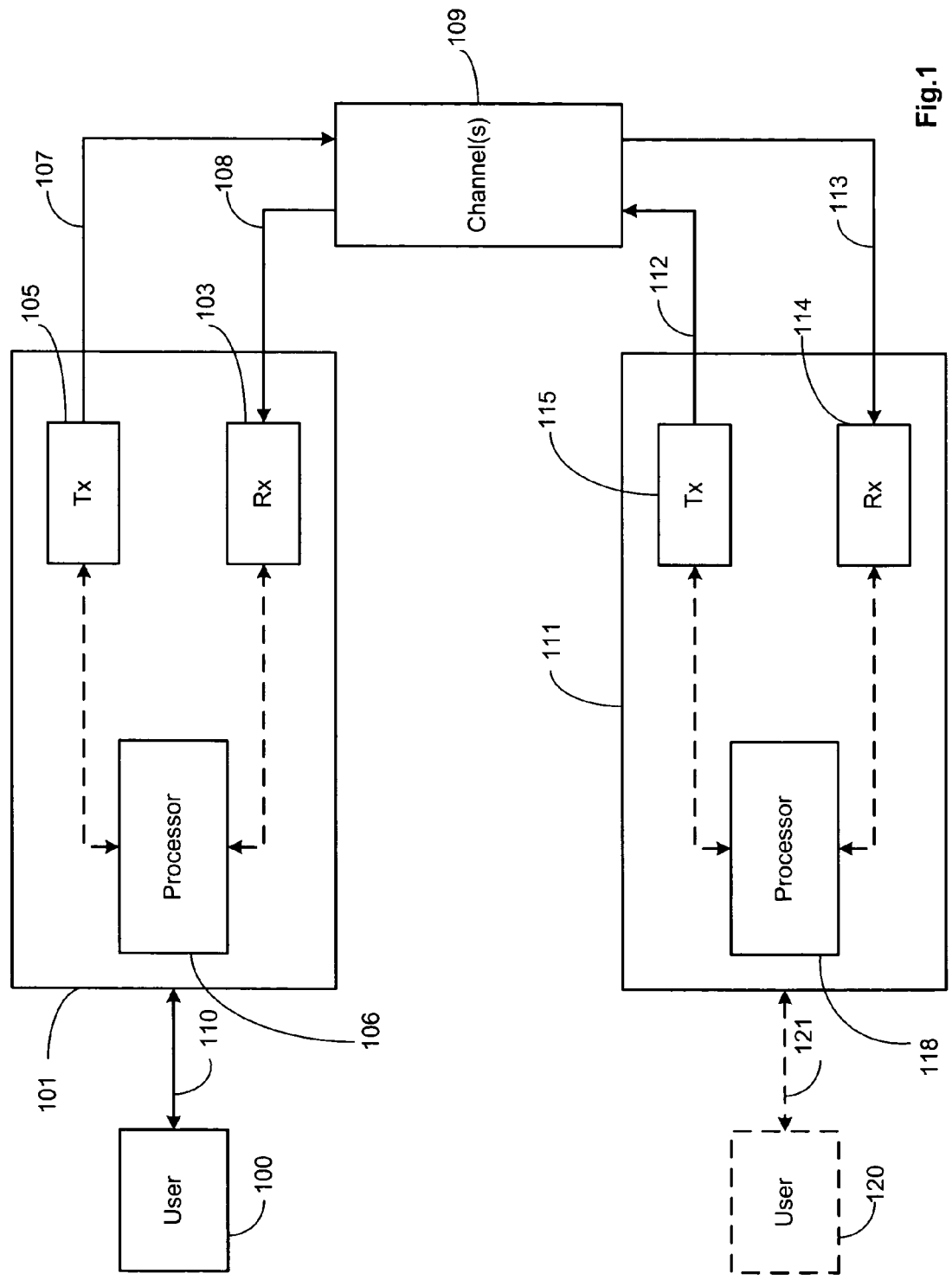
FIG. 1 illustrates a block diagram of a generic communication system that may be employed in connection with one embodiment of the present invention.

The following description is made with reference to the appended figures.

According to one embodiment of the present invention, impairment, burst noise, or other distortion-inducing mechanism of a duration of one up to several chips (6 chips for example) is detected. Means are provided to correct symbol decisions even in the presence of such impacted or distorted chips. More specifically, one embodiment of the present invention relates to means for detecting at least one and up to several chip(s) with increased impairment, distortion, or noise as provided below. In the embodiments provided below, it is contemplated that a chip plays the roll of a symbol, although other embodiments are also contemplated as discussed.

One embodiment of the present invention relates to a spreading technique to transmit symbols at the same time on the same frequency. More specifically, one embodiment of the present invention relates to a Synchronous Code Division Multiple Access technique for communication (alternatively referred to as "SCDMA"). More specifically, this invention relates to SCDMA communications used, in one embodiment, with a DOCSIS 2.0 physical layer standard (alternatively referred to as the "DOCSIS standard"), which is incorporated herein by reference in its entirety. The DOCSIS standard defines the physical layers in which pluralities of CMs transmit data upstream to and receive data downstream from the CMTS or headend.

In one embodiment of the present invention using SCDMA, about 128 spreading codes are available for modulating each upstream-transmitted symbol. In this embodiment, up to 128 symbols may be transmitted simultaneously, each symbol using its own spreading code. Each spreading code consists of a sequence of +1 or −1 valued chips, such that there are 128 such chips in each spreading code. In this embodiment, the symbol amplitude and angle are modulated using a vector, applying the vector or its additive inverse (i.e., 180 degree rotation) to the symbol.

In one embodiment, the spreading codes are orthogonal if perfectly time-aligned, and thus the 128 symbols will not interfere with each other, even though they are transmitted at the same time on the same channel. For example, two waveforms are orthogonal to each other if, after multiplying them by each other and integrating, the result of the integration is zero. In the SCDMA used with one embodiment of the present invention, at least one but up to 128 spreading codes may be used at one time. These spreading codes may be allocated to one CM, such that that CM is granted all the spreading codes (128 for example), up to the spreading codes be allocated to 64 different CMs, such that two spreading codes are granted to each CM. QAM symbols of two bits per symbol and more are spread with the assigned codes, one spreading code per QAM symbol, although other arrangements are contemplated.

In one embodiment using SCDMA, the spreading codes are cyclical shifts of one 127-chip spreading code, except for one additional chip. Thus, in this embodiment, the spreading codes are nearly cyclical shifts of one another.

For SCDMA to work efficiently, all the spreading codes should be synchronized as they arrive at the receiver. Timing misalignments result in inter code interference (alternatively referred to as "ICI"), which may degrade performance.

Various channel impairments also degrade performance, and special receiver techniques may be employed to limit or mitigate the degradation caused by such channel performance.

FIG. 1 illustrates a block diagram of a generic communication system that may be employed in connection with one embodiment of the present invention. The system comprises a first communication node 101, a second communication node 111, and at least one channel 109 that communicatively couples the nodes 101 and 111. The communication nodes may be, for example, cable modems, DSL modems or any other type of transceiver device that transmits or receives data over one or more channels (generally referred to as CMs).

The first communication node 101 comprises a transmitter 105, a receiver 103, and a processor 106. The processor 106 may comprise, for example, a microprocessor. The first communication node 101 communicates with or is communicatively coupled to a user 100 (e.g., a computer) via communication link 110, and to the channel 109 via communication links 107 and 108. Of course, communication links 107 and 108 may be combined into a single communication link.

Similarly, the second communication node 111 comprises a transmitter 115, a receiver 114, and a processor 118. The processor 118, like processor 106, may comprise, for example, a microprocessor. The second communication node 111 likewise is communicatively coupled to the at least one channel 109 via communication links 112 and 113. Again, like communication links 107 and 108, the communication links 112 and 113 may also be combined into a single communication link. The communication node 111 may also be communicatively coupled to a user 120 (again a computer, for example) via communication link 121. In the case when communication node 111 is a headend, for example, user 120 may not be present.

During operation of the illustrated embodiment of FIG. 1, the user 100 may communicate information to the user 120 (or the headend) using the first communication node 101, the at least one channel 109 and the second communication node 111. Specifically, the user 100 communicates the information to the first communication node 101 via communication link 110. The information is transformed in the transmitter 105 to match the restrictions imposed by the at least one channel 109. The transmitter 105 then communicates the information to the at least one channel 109 via communication link 107.

The receiver 114 of the second communication node 111 receives, via communication link 113, the information from the at least one channel 109 and transforms it into a form usable by the user 120. Finally, the information is communicated from the second communication node 111 to the user 120 via the communication link 121.

Communication of information from user 120 to user 100 may also be achieved in a similar manner. In either case, the information transmitted/received may also be processed using the processors 106/118.

Figure 2:
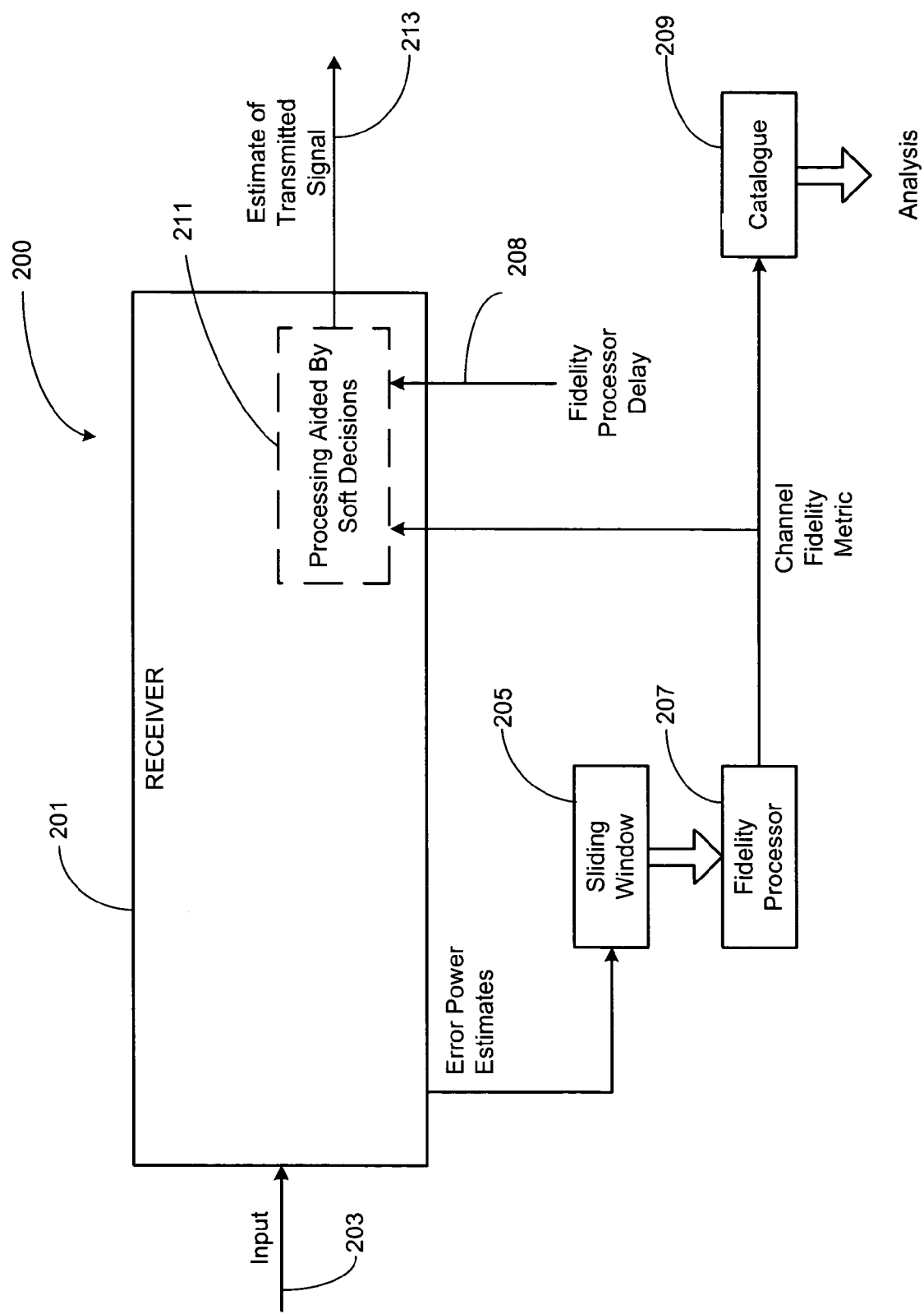
FIG. 2 illustrates a block diagram of an impairment mitigation system in accordance with one embodiment of the present invention.

FIG. 2 illustrates a block diagram of an impairment mitigation system 200 in accordance with one embodiment of the present invention. The system 200 may be contained, for example, in one or both of the communication nodes of FIG. 1. Error power estimates may be generated for analog modulations on a sample-by-sample basis. A receiver 201 receives an input at input 203 of either noise (when no signal is present) or a signal with time varying distortion and/or noise, for example. The receiver 201 uses the input to generate error power estimates, and may do so either on a bit by bit basis or using a sequence of bits (or on a symbol by symbol basis or using a sequence of symbols, in a digital communications example). A sliding window 205 receives the error power estimates. The error power estimates are processed in a fidelity processor 207 and a metric for channel fidelity is continuously generated as the window progresses (i.e., over time). The behavior of the metric versus time may be catalogued (see catalogue 209) and/or analyzed and used to optimize the transmission waveform. The behavior of the metric versus time may also be used to enhance receiver performance in real-time, near-real time, or even in a post-reception, post-processing mode.

A delay 208 between the input error power estimates of the window 205 and the corresponding channel fidelity metric is known for a given fidelity processor, and is provided back (made known) to a remainder of the system. The system uses the evolving fidelity metric in its processing, which may be aided by soft decisions designated 211. Soft decisions comprise, for example, erasure decoding or standard soft decision decoding, such as Viterbi decoding. In any case, the receiver outputs an estimate of the transmitted signal (reference numeral 213).

While FIG. 2 illustrates a system having some components and functionality located outside of the receiver, it is contemplated that such system may have additional components or functionality located within the receiver, or may in fact be entirely contained within the receiver. In addition, it is also contemplated that the estimation of the error power and the processing shown as being performed within the receiver of FIG. 2 may instead be performed outside of the receiver.

Figure 3:
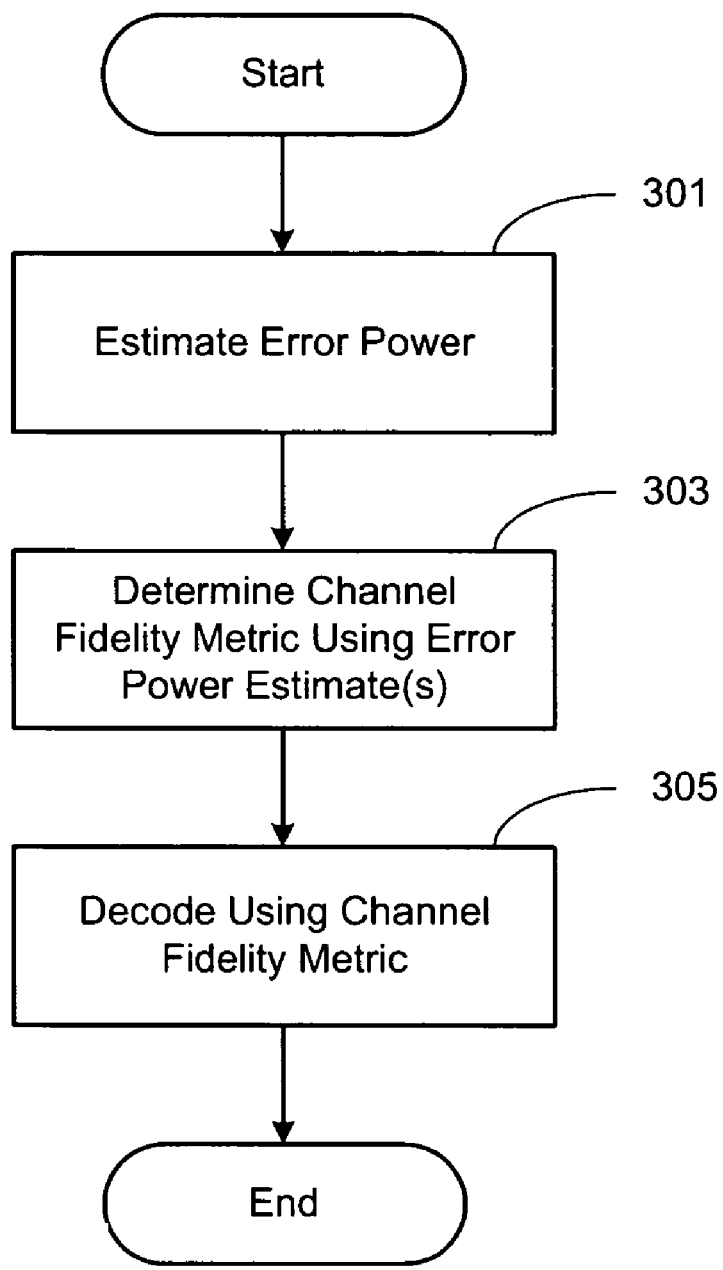
FIG. 3 illustrates a flow diagram of one embodiment of a method that may be performed using the system of FIG. 2, in accordance with one embodiment of the present invention.

FIG. 3 illustrates a flow diagram of one embodiment of a method that may be performed using the system of FIG. 2, in accordance with the present invention. In one operation of the method, the error power of an input to the system is estimated as illustrated by block 301. A fidelity metric is determined, using the error power estimate as illustrated by block 303. The determined fidelity metric is then used to decode the input as illustrated by block 305. The method illustrated in FIG. 3 may be employed on a limited basis, such as only during the presence of the signal of interest for example, or may be employed continuously. In other words, the method specifically illustrated in FIG. 3 may be employed in a continuous loop type fashion, either for a limited or extended period of time. In either case, the error power of the input is estimated over time, and fidelity metrics are determined (each using one or more error power estimates of the input) and used to decode the input over time.

Figure 4:
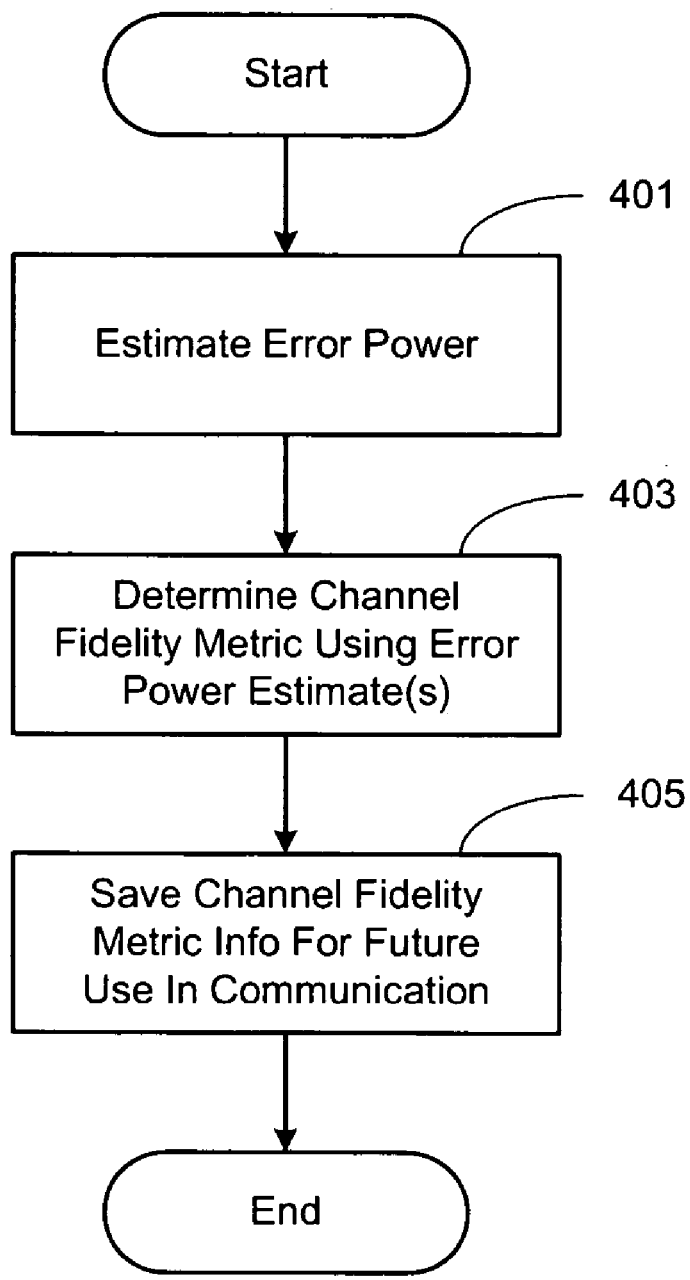
FIG. 4 illustrates a flow diagram of another embodiment of a method that may be performed using the system of FIG. 2, in accordance with one embodiment of the present invention.

FIG. 4 illustrates a flow diagram of another embodiment of a method that may be performed using the system of FIG. 2, in accordance with one embodiment of the present invention. In one embodiment, the error power of an input to the system is estimated as illustrated by block 401. A fidelity metric is determined, using the error power estimate as illustrated by block 403. The determined fidelity metric is then saved for future use in communications as illustrated by block 405. Like the method illustrated in FIG. 3, the method illustrated in FIG. 4 may be employed on a limited basis, such as only during time periods when no signal of interest is present, for example, or may be employed continuously. In other words, the method specifically identified in FIG. 4 may, like that method illustrated in FIG. 3, be employed in a continuous loop type fashion, for a limited or extended period of time. In either case, the error power of the input is estimated over time, fidelity metrics are determined (each using one or more error power estimates of the input) and information about the fidelity metrics stored for future use in communications.

Specifically, the stored information about the fidelity metrics may be used in transmit waveform optimization for example. In other words, the information may be used to determine a waveform that best suits the communication channel given what has been learned about the channel over time, as reflected in the stored fidelity metrics. The stored information about the fidelity metrics may also (or alternatively) be used in selecting receiver algorithms that are robust given the limitations of the channel, again as reflected in the stored fidelity metrics. Additional detail regarding use of catalogued channel fidelity metric information for future communications is provided below.

In one embodiment of the present invention, the methods discussed above with respect to FIGS. 3 and 4 may be used in conjunction. For example, the method of FIG. 3 may be employed when a signal of interest is present, while the method of FIG. 4 may be used when a signal of interest is not present.

The error power estimates provided previously with respect to FIGS. 2-4 may be generated in a number of ways, in the presence or absence of a signal of interest. In the absence of a signal of interest, the input power to the receiver may simply be the noise power. Filtering to the bandwidth of the signal of interest may be used if desirable.

In an embodiment where the communication system (similar to the system of FIG. 2) is a digital communications system, one particular method for gathering the error power estimates during signaling is to calculate the distance (squared, for power) between the received signal and the nearest constellation point in the digital system's signaling alphabet. This error vector is typically available or readily obtainable from a slicer in a digital communications receiver.

The length of sliding window 205 of FIG. 2 is important in its selection and application, but in general, may be any length. A shorter window is a subset of a longer window, so longer and longer windows may theoretically provide better and better channel fidelity metrics. However, in practice, the window length should, for example: (1) be sized to accommodate a given (tolerable) amount of delay (acceptable to the rest of the receiver processing) in generating the channel fidelity metric; (2) not unnecessarily increase the complexity of the overall receiver; and (3) account for the durations or dynamics expected, or previously observed, in the dominating channel impairments. For example, if transitory channel impairment has a duration of up to 10 symbols in a given digital communications system, then it is hard to justify the use of a window of 100 symbols. Similarly, a window of only 4 symbols, with the expectation of a persistence of 10 symbols of a given impairment condition, needlessly lessens the ability of the fidelity processor to make the best channel fidelity assessment, as it is denied relevant (correlated) information regarding the channel fidelity.

Many forms are contemplated for processing the sequence of error power estimates in the fidelity processor 207 of FIG. 2, which forms may depend on: (1) the complexity allowed; (2) the size of the sliding window or duration or persistence of the impairment states; (3) the delay allowed in generating the channel fidelity metrics; and (4) on the use of the channel fidelity metric (i.e., the accuracy of the metric in matching the impairment level).

In its most simple form, the fidelity processor 207 may simply compare each error power estimate against a threshold, and output a binary channel fidelity estimate—i.e., "channel OK," and "channel degraded." While the window in this case consists of a single sample (or a single symbol in the digital communications example), the use of the catalogue of this information, and the beneficial use of this metric in subsequent receiver processing, may be employed in one embodiment of the present invention (such as shown in FIG. 2 and discussed with respect to FIGS. 3 and 4, for example).

Figure 5A:
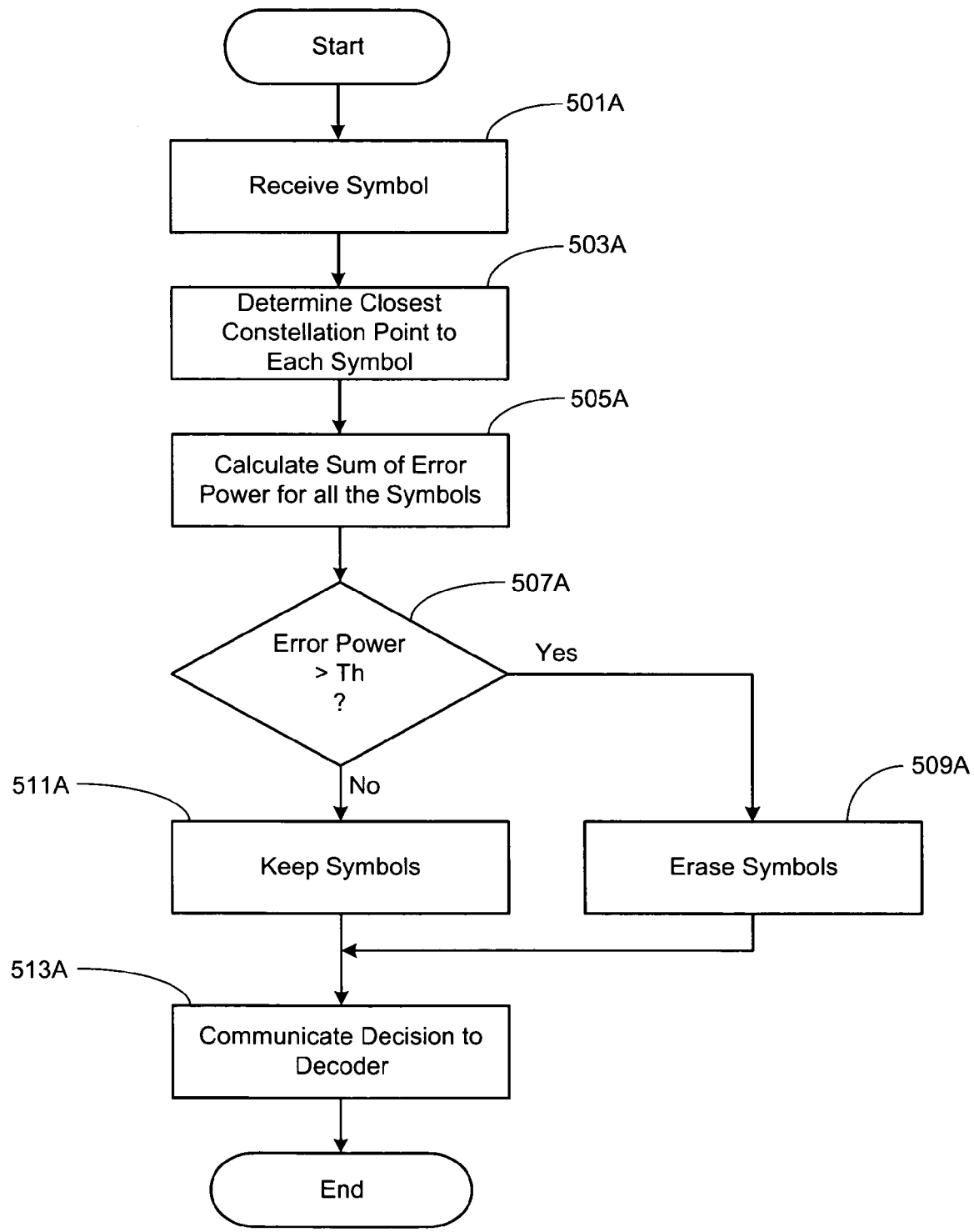
FIGS. 5A & 5B illustrate flow diagrams for impairment mitigation in accordance with specific embodiments of the present invention.

FIG. 5A illustrates a flow diagram of a method of impairment mitigation in accordance with one specific embodiment of the present invention, for use in connection with digital communications. First, a symbol (or set of symbols) is received as illustrated by block 501A, and the closest constellation point to each of the symbols is determined as illustrated by block 503A. As provided previously, the closest constellation point may be determined from a slicer in the receiver.

Next, the error power of the symbols is calculated using, for example, the square of the distance between the received signal and the nearest constellation point in the digital system's signaling alphabet, also as provided previously and as illustrated by block 505A. The sum of the error power of all the symbols is then compared to a threshold of error power as illustrated by block 507A. This is performed, for example, in the fidelity processor. If it is determined that the error power is greater than the threshold, it is assumed that the channel is degraded, and all the symbols are erased as illustrated by block 509A. If instead it is determined that the calculated error power of the symbols is not above the threshold (i.e., less than the threshold), it is assumed that the channel is OK, and the symbols are kept as illustrated by block 511A. In either case, the decision is communicated to the decoder as illustrated by block 513A. In other words, if the symbol is kept as illustrated by block 511A, the symbol is simply communicated to the decoder as illustrated by block 513A, whereas if the symbol is erased as illustrated by block 509A, an indication that the symbol has been erased is communicated to the decoder as illustrated by block 513A. This process is repeated for each set of symbols received.

While the method illustrated in FIG. 5A is performed on multiple symbols, it is contemplated that a subset of symbols may be considered. Furthermore, it is contemplated that one or more chip(s) (or other waveforms) may play the roll of a symbol.

Figure 5B:
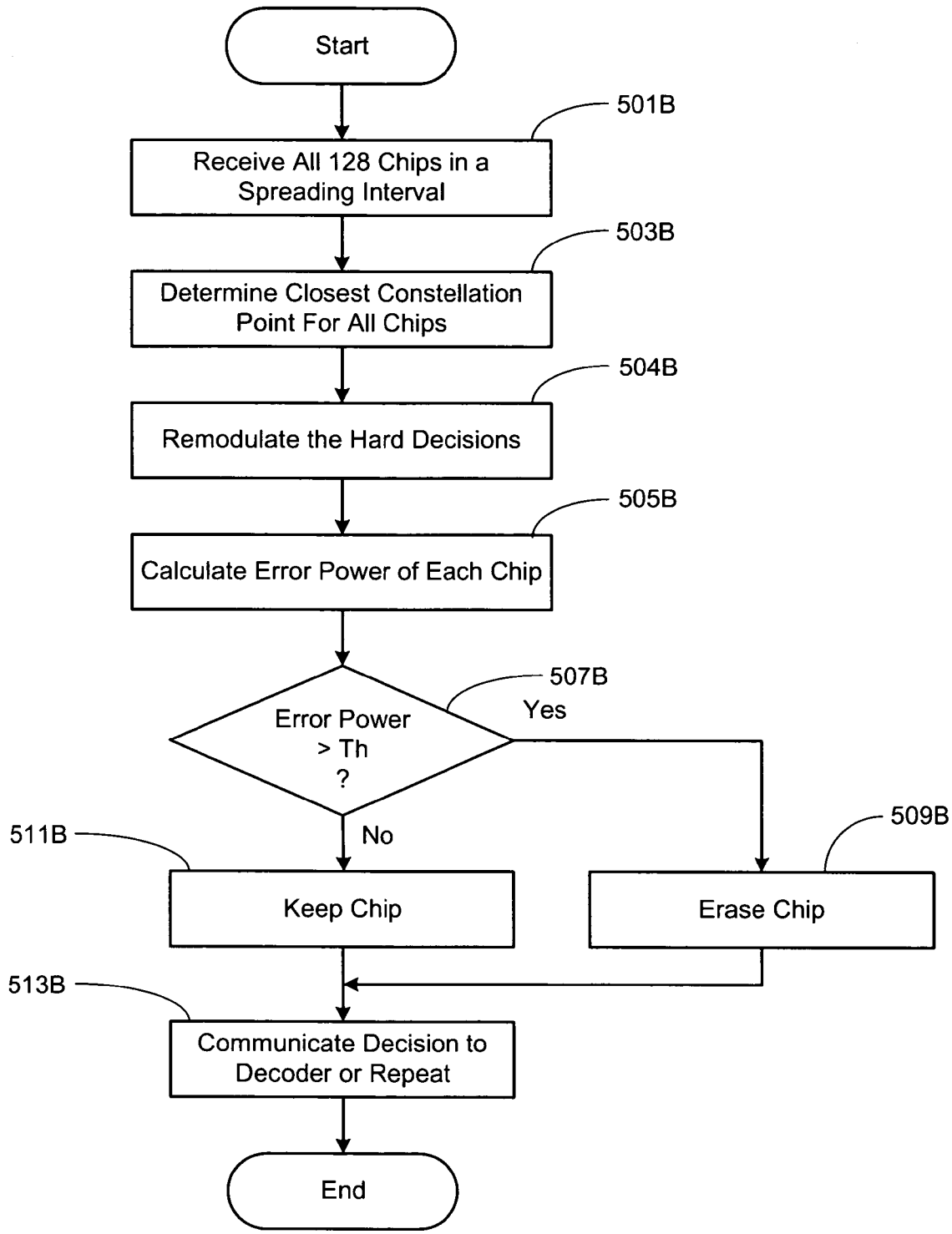

For example, with SCDMA, after hard decisions are made in an iterative process or manner, these hard decisions may be remodulated and the error power calculated for each chip in the spreading interval. FIG. 5B illustrates a flow diagram of a method of impairment mitigation in accordance with one specific embodiment of the present invention. First, all 128 chips in a spreading interval are received as illustrated by block 501B, and the closest constellation point to all the chips is determined as illustrated by block 503B. As provided previously, the closest constellation point may be determined from a slicer in the receiver. The hard decisions are remodulated as illustrated by block 504B.

Next, the error power of the chips is calculated as illustrated by block 505B. It is contemplated that blocks 503B and 505B calculate the error power of a chip using the remodulated ensemble set of symbol hard decisions (i.e., the closest constellation point for each of the demodulated spread symbols). The error power of each chip is then compared to a threshold of error power as illustrated by block 507B. If it is determined that the error power is greater than the threshold, it is assumed that the channel is degraded, and the chip is erased as illustrated by block 509B. If instead it is determined that the calculated error power of the chip is not above the threshold, it is assumed that the channel is OK, and the chip is kept as illustrated by block 511B. In either case, the decision is communicated to the decoder as illustrated by block 513B or repeated for multiple iterations. Moreover, the methods provided previously may be employed using different means for calculating the error power and different processing may be used to determine whether or not the channel is OK or whether particular symbol(s) (chips or other waveforms) should be erased or kept. In addition, the method may be employed in connection with analog communications, using samples rather than symbols. As mentioned above with respect to FIG. 4, channel fidelity metric information obtained from the fidelity processor may be stored and used for future communications. In the particular example illustrated in FIG. 5, by analyzing the duty factor of the "channel OK" versus the "channel degraded" condition, and by analyzing the relative persistence of these conditions, the transmitting waveform may be adapted to these parameters. The appropriate amount of parity in FEC coding, and the best choice of interleaver parameters in FEC employing interleaving, are strongly related to these parameters.

Similarly, as provided previously with respect to FIG. 3, the receiver may make use of this information directly. In the example of digital communications, the receiver marks the bits corresponding to the "channel degraded" condition as having very low confidence in subsequent FEC decoding. Reed-Solomon codes may accommodate both error correction and erasure marking in their decoding. By marking Reed-Solomon symbols that contain bits transmitted during "channel degraded" conditions as erasures, the decoder benefits from having more information than a typical Reed-Solomon decoder working with hard decisions only. In other words, using the side information about the channel fidelity, the decoder may produce better results (i.e., higher rate of correct decoding).

A Reed-Solomon decoder may accommodate twice as many erased symbols as it can correct erred symbols, so finding instances of degraded channel fidelity, which often lead to erred Reed-Solomon symbols benefits the decoder, and marking these as erasures, greatly benefits the decoder. If nearly all of the Reed-Solomon symbol errors are attributable to the degraded channel, and if the degraded channel is fairly accurately detected (in the fidelity processor for example), then almost twice as many instances of the degraded condition may be tolerated.

Other examples of fidelity processor include summing the error power estimates in the sliding window, and providing these (or a scaled version such as an average) as the channel fidelity estimate. Alternately, this sum or average may itself be quantized into a binary decision, or a finite number of levels (such as "channel pristine," "channel OK," and "channel degraded" in one example), or even compressed, via a square root operation, for example. If a dominant channel impairment is expected to persist for a duration of many symbols, then summing the error power estimates for at least several symbols increases the accuracy of the channel fidelity metric, especially during the "middle" of the impairment condition.

However, determining the precise moment when the degraded condition "turned on" and "turned off" may be difficult if a long window for summing is used, without modification. One approach is to increase the time-domain precision of the fidelity processor, is to compute the average error power during a window, and apply two thresholds, one on the average, and one on individual samples of the error power estimates. The "channel degraded" assignment is only outputted at times corresponding to samples, where the average error power in the window exceeded threshold #1, AND either (a) the sample was between two samples which exceeded threshold #2, or (b) the sample was the only sample in the window which exceeded threshold #2.

Once again, a particular example may be to employ the summing of the noise power estimates within the window, as provided previously, and this result compared with a threshold. This binary channel fidelity metric is then associated with the middle sample of the window (i.e., where the delay corresponds to half the window duration). With Reed-Solomon FEC, as provided previously, the "channel degraded" associated with any bits in a Reed-Solomon symbol result in that symbol being marked for erasure in the decoding process. The method described above may again be applied to enhance the time-domain precision of the channel fidelity metric.

Figure 6:
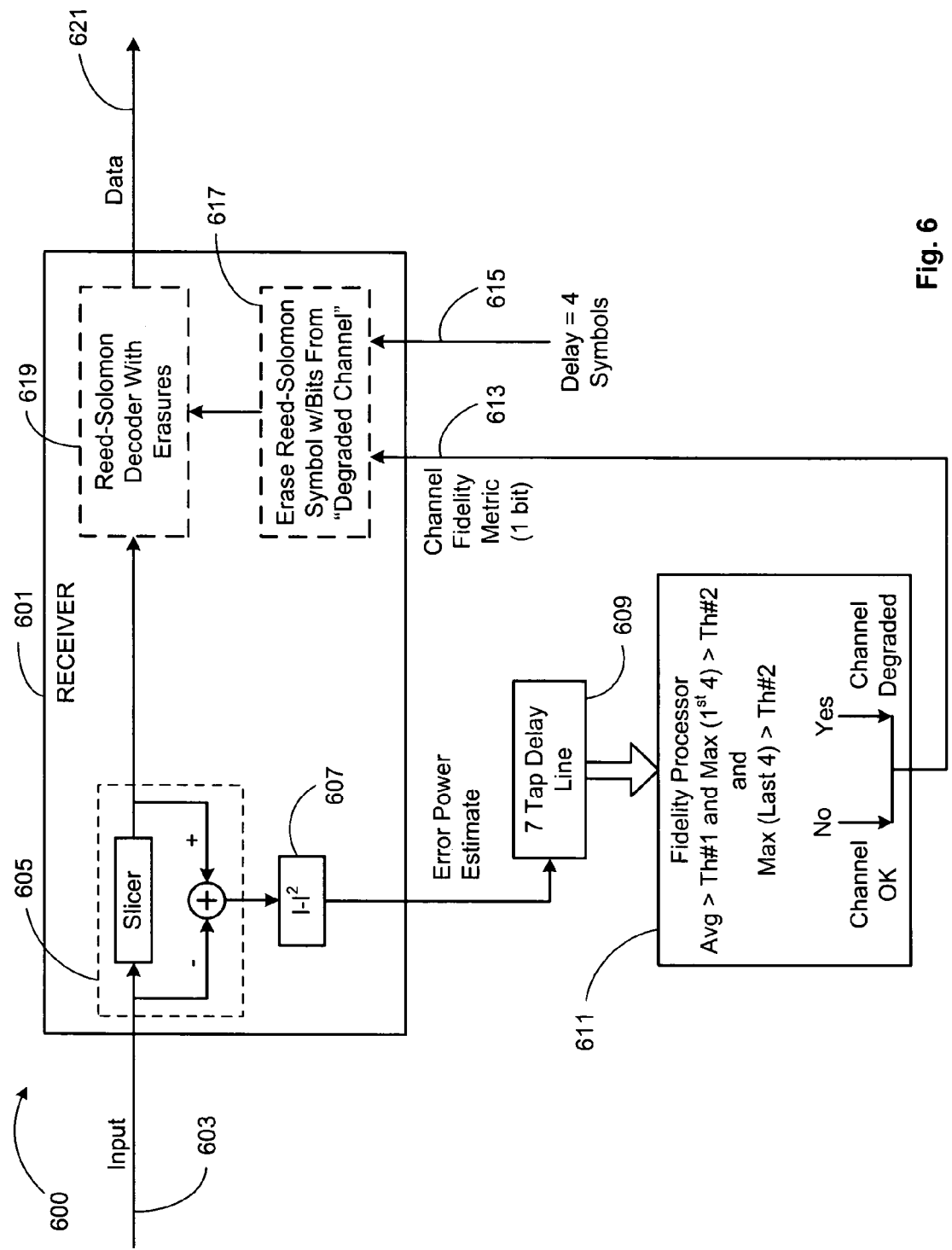
FIG. 6 illustrates a block diagram of an impairment mitigation system in accordance with another embodiment of the present invention.

FIG. 6 illustrates a block diagram of an impairment mitigation system 600 in accordance with a particular embodiment of the present invention. The system 600 (similar to system 200 of FIG. 2) may be contained, for example, in one or both of the communication nodes of FIG. 1. Referring to FIG. 6, a receiver 601 receives at input 603 an input signal and/or noise, in addition to an occasional high-level noise burst, for example. The receiver, using slicer 605 and block 607, generates error power estimates. He receiver generates such error power estimates either on a bit-by-bit basis or using a sequence of bits (or on a symbol by symbol basis or using a sequence of symbols, in a digital communications example, or sample-by-sample in an analog waveform). A sliding window 609, depicted as a 7-tap delay line, receives the error power estimates, which are then processed in a fidelity processor 611. The fidelity processor 611 continuously generates a metric for channel fidelity as the window (i.e., time) progresses.

Specifically, 7-tap delay line 609 captures 7 consecutive error power estimates at a time, and computes an average error power using the 7 captured estimates. In addition, the highest (maximum) error power of the first 4 captured estimates is determined (i.e., estimates 1 through 4), and the highest (maximum) error power of the last 4 captured estimates (i.e., estimates 4 through 7) is likewise determined. Next, a determination is made whether the average error power calculated is greater than a first threshold, and whether both maximum error powers are greater than a second threshold. If any one is not above its respective threshold, a "channel OK" indication is sent to the receiver 601. If all three are above or greater than their respective thresholds, then a "channel degraded" indication is sent to the receiver 601. This indication may be a simple 1 bit channel fidelity metric (e.g., a "1" for channel OK and a "0" for channel degraded for example). In a digital communications example, the fidelity processor 611 generates a 1-bit channel fidelity metric over time for QAM constellations, for example.

The receiver 601 receives the channel fidelity metric as illustrated by reference numeral 613 and is aware of the 4 sample or symbol delay as illustrated by reference numeral 615. Processing block 617, knowing the channel fidelity metric and the particular sample or symbol being considered from the known delay, either erases the particular sample or symbol being considered (corresponding to a "channel degraded" fidelity metric), or keeps the particular sample or symbol being considered (corresponding to a "channel OK" fidelity metric). This process is repeated so that the error power estimate corresponding to each sample or symbol is considered by the fidelity processor 611. In the embodiment illustrated in FIG. 6, the particular sample or symbol being considered by the fidelity processor 611 is that corresponding to the error power estimate found at the $4^{th}$ position in the 7 tap delay line 609 (and hence the 4 sample or symbol delay).

A decoder 619, such as, for example, a Reed-Solomon Decoder, decodes the samples or symbols with erasures, as determined by the fidelity processor 611. Many different types of algorithms may be used in the fidelity processor to generate fidelity metrics. Decoded data, an estimate of the transmitted signal for example, is outputted at output 621 of the receiver 610. It is contemplated that the functionality of processing block 617 may be part of the decoder 619. It is also contemplated that means other than as shown in, or specifically discussed with respect to FIG. 6 may be used to calculate error power and to generate the fidelity metric. Further, quantities other than 7 may be used for the tap delay line.

In addition, while FIG. 6 illustrates a system having some components and functionality located outside of the receiver, it should be understood that such system may have additional components or functionality located within the receiver, or may in fact be entirely contained within the receiver. In addition, it should also be understood that the estimation of the error power and the processing depicted as being performed within the receiver of FIG. 6 may instead be performed outside of the receiver.

Figure 7A:
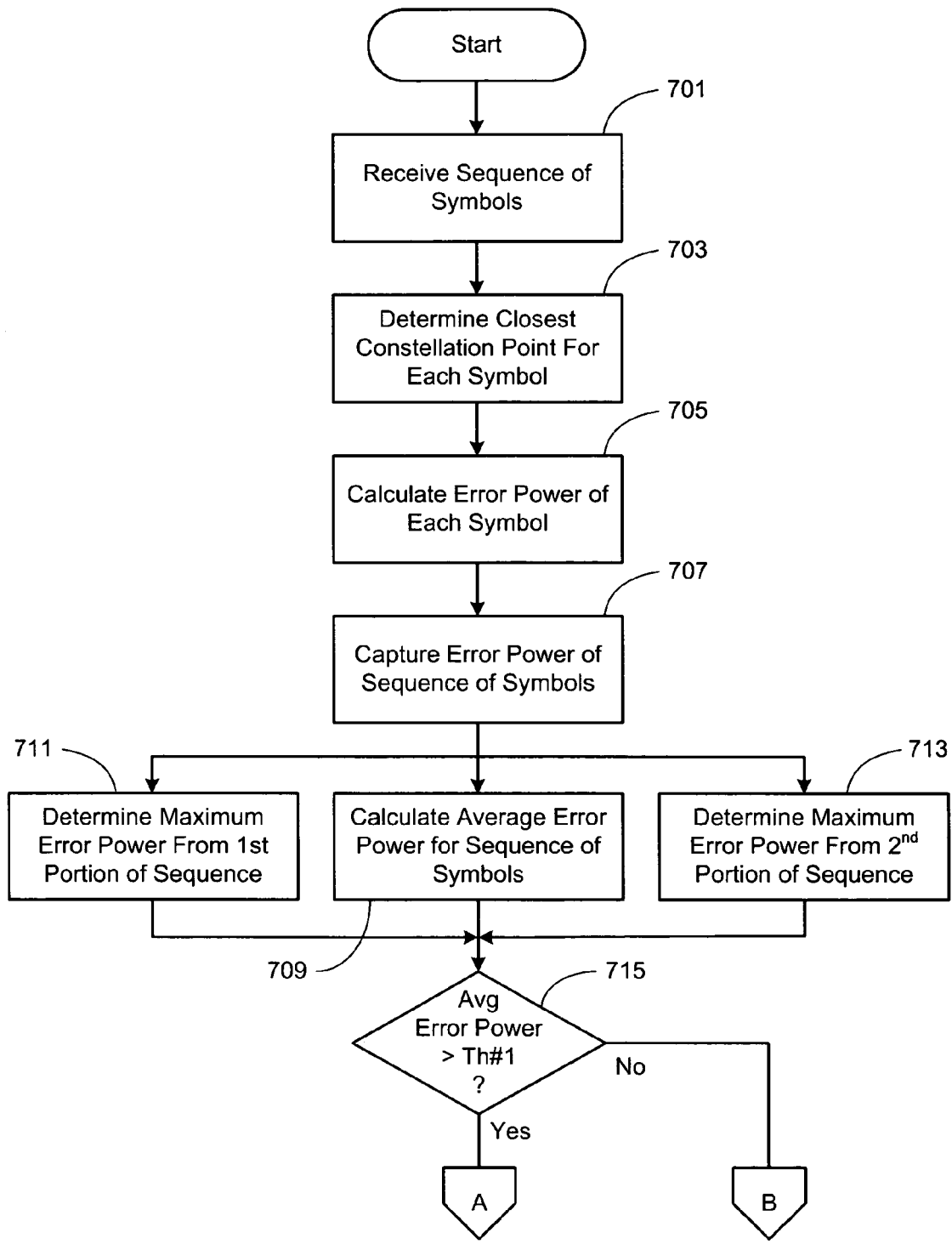
FIGS. 7A & 7B illustrate a flow diagram of a method of impairment mitigation for use in connection with digital communications in accordance with one specific embodiment of the present invention.
Figure 7B:
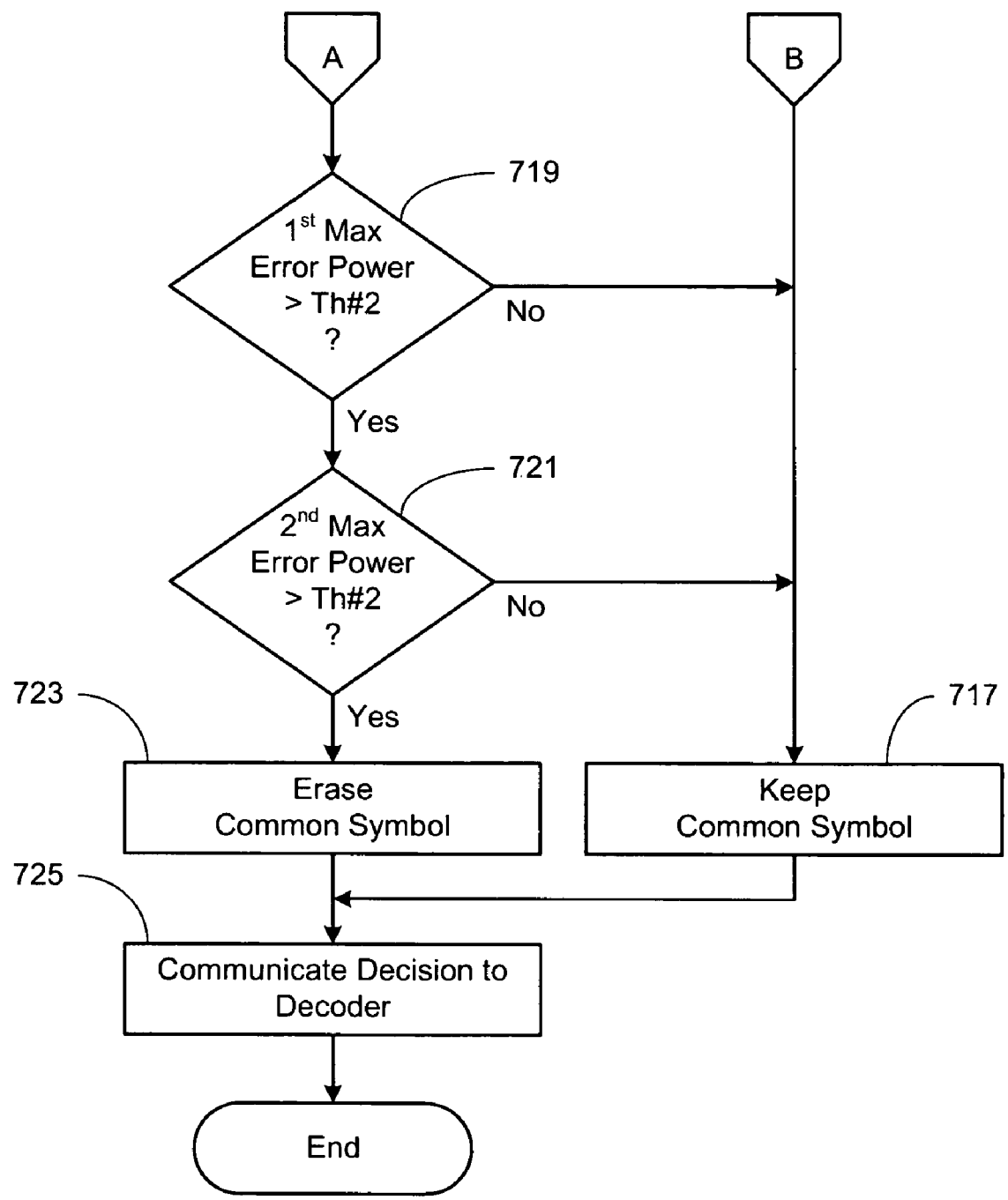

FIGS. 7A & 7B illustrate a flow diagram depicting a method that may be employed using the system of FIG. 6, in a digital communications embodiment of the present invention. A sequence of symbols is received as illustrated in block 701, and the closest constellation point to each symbol is determined as illustrated in block 703. The error power of each symbol is calculated, for example, using the square of the distance between the received symbol and the nearest constellation point in the digital system's signaling alphabet, as provided previously and as illustrated in block 705. Of course, other methods of calculating or estimating the error power of each symbol may be used.

Next, the error power of a sequence of symbols is captured as illustrated in block 707, and an average power of the captured sequence is calculated as illustrated in block 709. In addition, a maximum error power from a first portion of the captured sequence is determined as illustrated in block 711, and a maximum error power from a second portion of the sequence is likewise determined as illustrated in block 713.

The first and second portions of the sequence each include a common symbol that is the "middle" symbol of the whole sequence (i.e., the last symbol of the first portion and the first symbol of the second portion for example). In other words, for a sequence of length n, an odd number, the middle symbol may be defined by $1+(n-1)/2$. It is this number that defines the symbol that is being considered as well as the symbol delay for decoding purposes. Again, as provided previously with respect to FIG. 6, the sequence length may be 7, which makes symbol 4 of the sequence the symbol that is being considered, and defines the decoder delay to be 4 symbols. It is contemplated that even numbers may be used for window length, too, and the symbol (or sample) under consideration need not be the one in the center of the window. The use of an odd window length and center symbol (sample) for which the channel fidelity is being estimated is provided only as an example.

The average error power of the sequence is then compared to a first threshold as illustrated in block 715. If the average is not above the first threshold, the common symbol is kept as illustrated in block 717; otherwise, the maximum error power of the first portion of the sequence is compared to a second threshold as illustrated in block 719. If that first maximum is not above the second threshold as illustrated in block 719, the common symbol is kept as illustrated in block 717; otherwise, the maximum error power of the second portion of the sequence is compared to the second threshold as illustrated in block 721. If that second maximum is not above the first threshold, the common symbol is kept; otherwise, the common symbol is erased. In any case, the decision of whether to erase or keep the common symbol is communicated to the decoder as illustrated in block 725. The process is then repeated, so that each symbol received is at some point considered (i.e., each received symbol is the common symbol for one iteration of the process).

For a 16 QAM constellation example having a constellation RMS power of 3.162 (i.e., the square root of 10) and, for example, a 7-symbol sequence, the first threshold may be 0, and the second threshold may be 0.64, for example. Of course, the second threshold may be set to 0, such that just the average error power of the whole sequence is used.

Figure 8A:
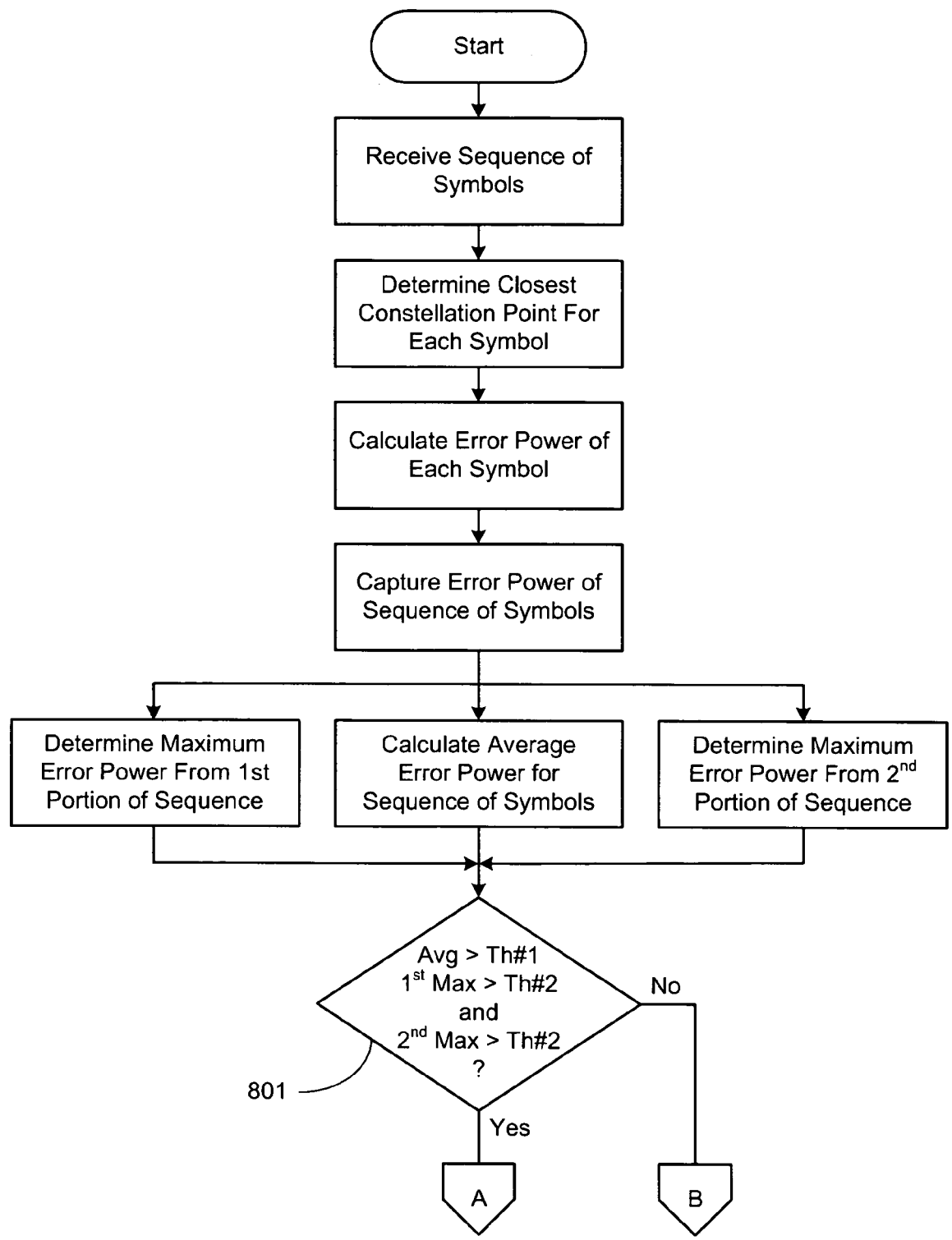
FIGS. 8A & 8B illustrate a flow diagram of a method of impairment mitigation used in connection with digital communications in accordance with another specific embodiment of the present invention.
Figure 8B:
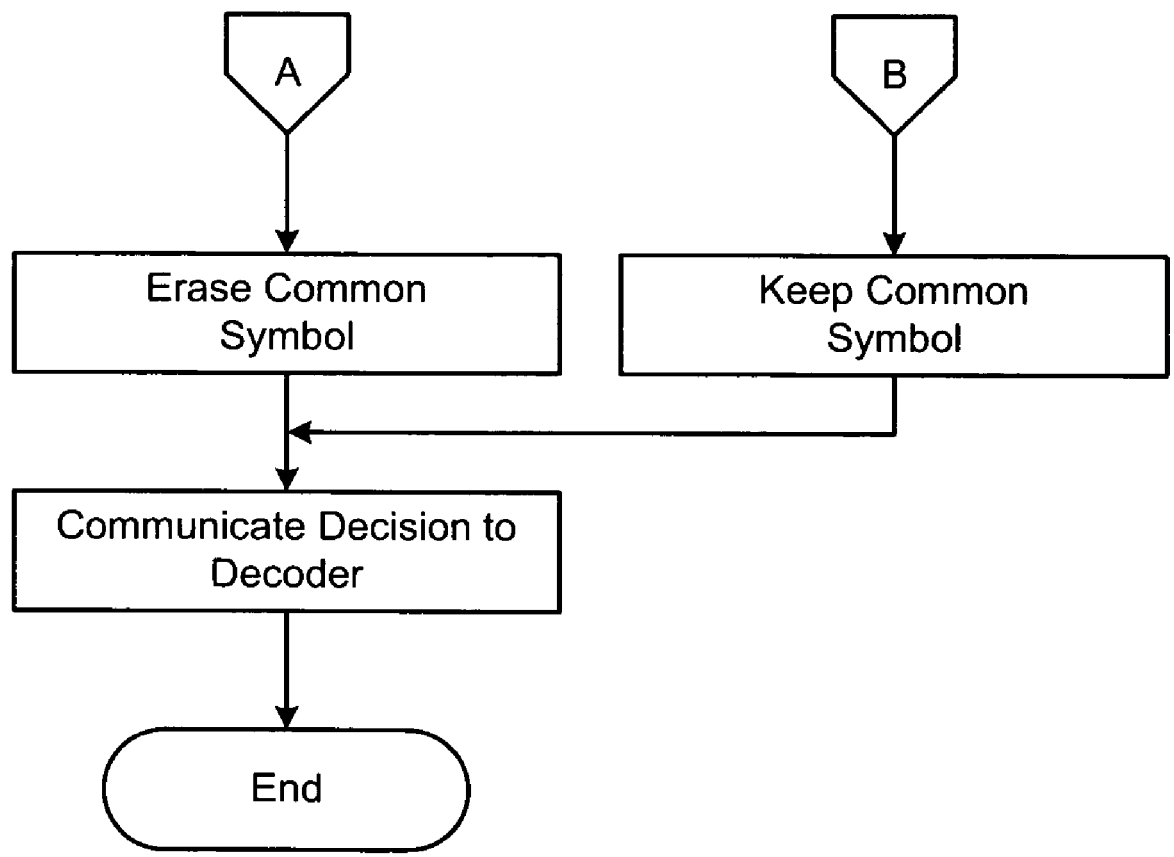

While the decisions made by blocks 715, 719, and 721 of FIGS. 7A-7B are shown to be in a particular sequence, any order of those decisions may be employed. In addition, those decisions may instead be performed simultaneously, rather than sequentially, as shown in FIGS. 8A-8B. Specifically, decision block 801 of FIG. 8A replaces the decision blocks 715, 719 and 721 of FIGS. 7A-7B. A single determination is made at block 801 of FIG. 8A, based on the three comparisons, whether the common symbol should be erased or kept.

Another specific example illustrating applying the channel fidelity metric to enhance the receiver processing follows with the summing of the error power over a sliding window. Especially with high density constellations, and with an impairment of low power or one such as gain compression, where the impairment likely does not cause the received, distorted signal to fall outside the normal signaling constellation, the fidelity processor may determine the presence of the impairment, but a significant fraction of the error power estimates may be rather small (since the received signal falls close to one of the many wrong symbols). In such instances, even using convolutional coding FEC and traditional Viterbi decoding, the branch metrics in the decoding process are not the most accurate reflection of the state of the channel fidelity when they are simply the error power estimates or log of error power estimates (for each symbol) from the slicer. Knowing that a degraded channel condition existed even when a signal was received "close" to a constellation point may be very beneficially used in the decoding, especially when "channel interleaving" is performed prior to the decoding, thus dispersing the impacted symbols.

Figure 9:
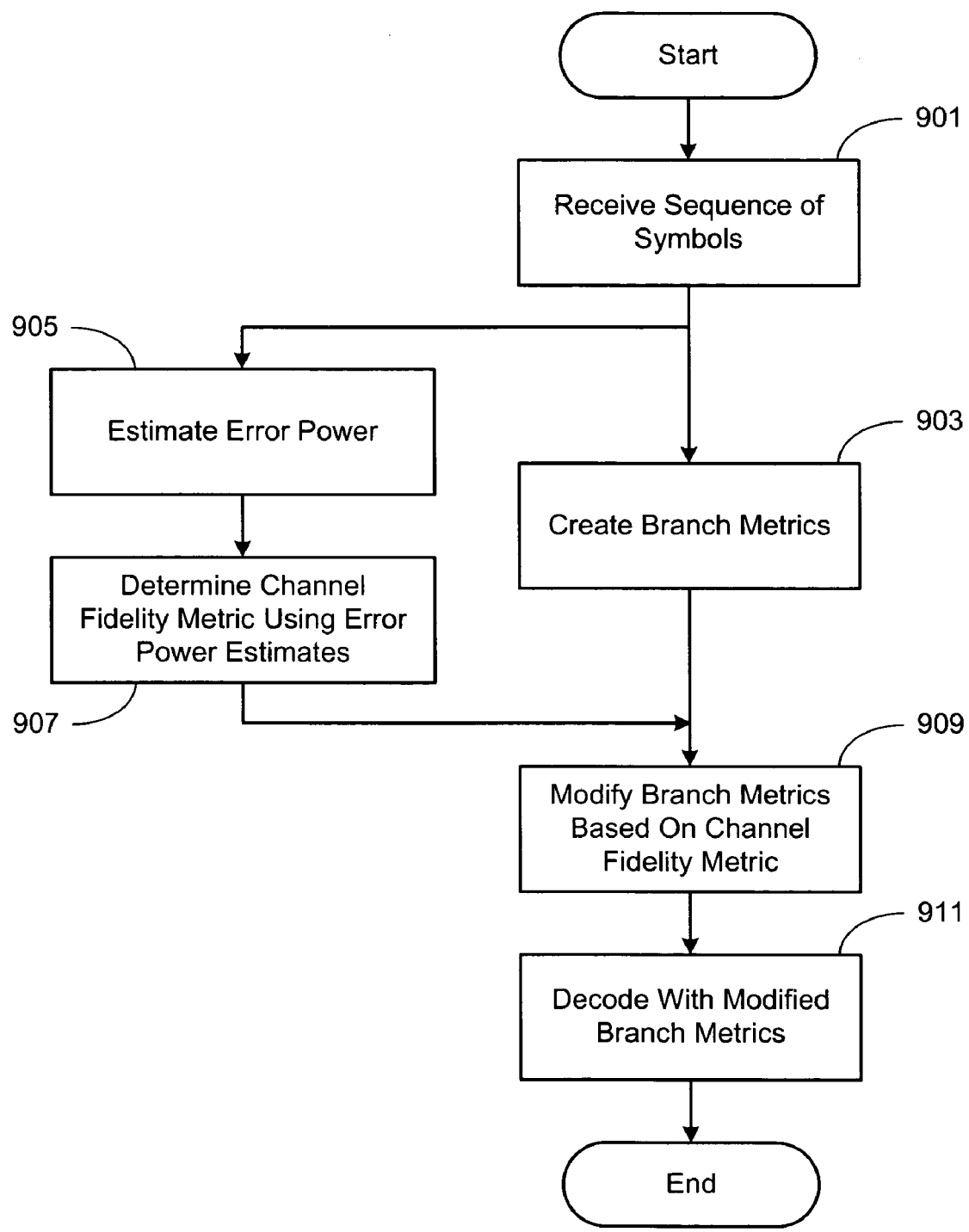
FIG. 9 illustrates a flow diagram of a method that uses a fidelity metric to modify branch metrics in the decoding process, in accordance with one embodiment of the present invention.

FIG. 9 illustrates a flow diagram illustrating a method that uses a fidelity metric to modify branch metrics in the decoding process, in accordance with one embodiment of the present invention. First, a sequence of symbols is received as illustrated in block 901, error power estimates are estimated or determined as illustrated in block 903, and channel fidelity metrics are determined using the error power estimates as illustrated in block 905. This may be achieved using any means provided herein, for example. In addition, branch metrics are created as illustrated in block 907. For example, in a Viterbi decoder example, branch metrics are created for the Viterbi decoder branches. (Scaled logarithms of the error power are typically used). The Viterbi branches are normally inversely related to the error power from various constellation symbols, since the branch metrics represent the likelihood of the branch transition.

Once such branch metrics are created as illustrated in block 907, the branch metrics are modified based on the channel fidelity estimate as illustrated in block 909. For example, the branch metric may be set to a low probability value if the channel fidelity is determined to be poor. Finally, decoding (e.g., Viterbi) is performed using the modified branch metric as illustrated in block 911. This overall process may then be repeated.

As mentioned above, various embodiments of the present invention provide for a fidelity processor that examines a sliding window of error power estimates to yield a channel fidelity metric. While specific fidelity processing examples have been discussed above, still other types of fidelity processing may be employed in connection with the various embodiments of the present invention. For example, median filters or other ranking devices may be used. In a median filter, the middle ranked value within a window is output.

Once again, as above, this value could be output "as is," or quantized with various thresholds, perhaps into a single binary output.

Other forms of nonlinear filtering may also serve as useful fidelity processors. For example, the error power estimates may be quantized to a binary level with a threshold, i.e., "'1" for greater than threshold and "0" for less than threshold, and these quantized samples filtered or averaged. This would simplify the "averaging" complexity, and a second threshold as described above may be applied to enhance the precision of marking the "turn on" and "turn off" of the severe impairments.

Still other types of fidelity processing may include, for example: (1) summing; (2) ranking; (3) thresholding and summing; (4) summing and twice thresholding (sum and individual points in the window); (5) quantizing the error power estimates or otherwise nonlinearly processing them (e.g., square root or log); (6) averaging across the window and taking the maximum of the average and (some factor multiplying) the middle error power estimate in the window; (7) taking the maximum of the median ranked value in the window and (some factor multiplying) the middle error power estimate in the window; (8) nonlinearly processing the error power estimates and averaging; and (9) quantizing the results from the aforementioned operations and/or nonlinearly processing them.

Furthermore, the channel fidelity metric may be used to analyze channel behavior. More specifically, the channel fidelity metric may be used to analyze for example duration and fraction of time of impaired conditions compared to unimpaired conditions, especially for determining most suitable FEC and symbol rates and constellation sizes, etc., for the dynamically varying channel. In addition, the channel fidelity metric may be applied to the receiver for beneficial use of processing signals received contemporaneously with the channel fidelity estimate. Some examples of using the channel fidelity metric to enhance receiver performance include: (1) marking Reed-Solomon symbols for erasure in a Reed-Solomon decoder capable of erasure and error correction decoding, and (2) in convolutional coded FEC (or other soft-decision decoders, such as Turbo decoding), affecting the soft-decision metric for a symbol with this additional channel fidelity metric.

This latter embodiment especially benefits from this technique if channel interleaving is performed on the symbol soft-decisions prior to the decoding. Various embodiments of the present invention are especially effective at enhancing receiver performance with severe impairment duration of multiple symbols, and with high density signaling constellations, as seen in these particular examples.

While the error power estimates provided previously above have been generated outside of the decoding process, decoding may be used to generate a potentially improved error power estimate. In other words, another method for generating the error power estimate includes actually performing a preliminary decoding (if FEC is employed), or partial decoding, and performing a better estimate of the transmitted waveform to more accurately estimate the error power. Such an approach means that there may be delays in the generation of the error power estimates, but often this is not a constraint. A second-pass at the decoding, now with the benefit of the channel fidelity metric (versus time) arising from the first-pass error power estimates, provides enhanced performance in the time-varying impairment scenario.

Figure 10:
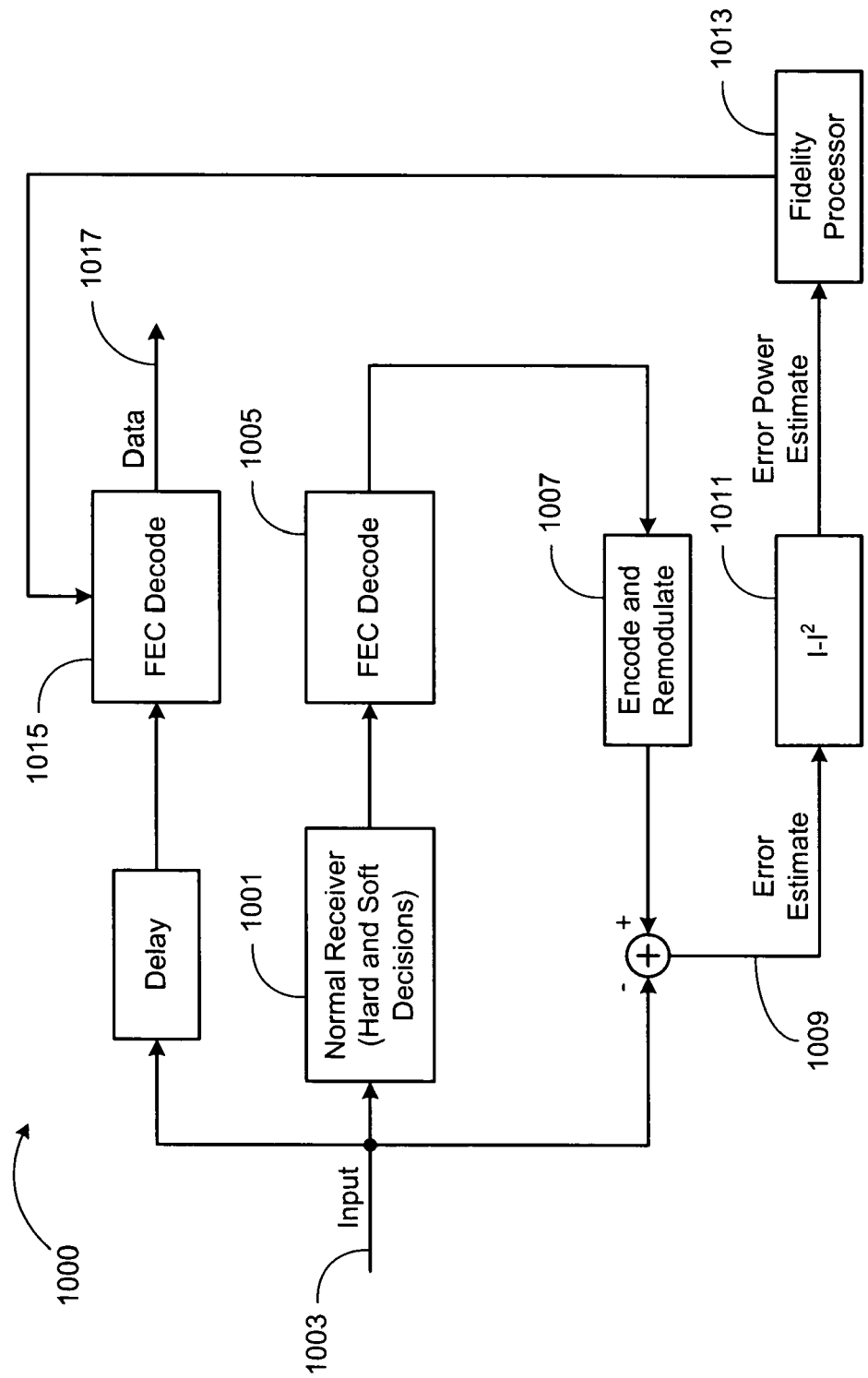
FIG. 10 illustrates a block diagram of an impairment mitigation system that uses preliminary decoding in generating error power estimates, in accordance with one embodiment of the present invention.

FIG. 10 illustrates a block diagram of an impairment mitigation system 1000 that uses preliminary decoding in generating error power estimates, in accordance with one embodiment of the present invention. The system 1000 may be contained, for example, in one or both of the communication nodes of FIG. 1. A receiver 1001 receives an input 1003, and performs normal hard and soft decisions. The information is then FEC decoded in FEC decoder 1005, and the information is then re-encoded and remodulated (for example by multiplying by the spreading signal for each of the symbols) by encoder 1007. The re-encoded information is then used along with the original input at 1003, to generate an error estimate as illustrated by reference numeral 1009, which in turn is used to calculate an error power estimate as illustrated by reference numeral 1011.

A fidelity processor 1013 uses the error power estimate to generate a channel fidelity metric, such as provided previously. FEC decoder 1015 uses the channel fidelity metric, along with the original, delayed input to decode the input, and output decoded data (i.e., an estimate of the transmitted signal) at output 1017. It is contemplated that the FEC decoder 1005 and FEC decoder 1015 may be separate units or devices, or combined into a single decoder.

Figure 11:
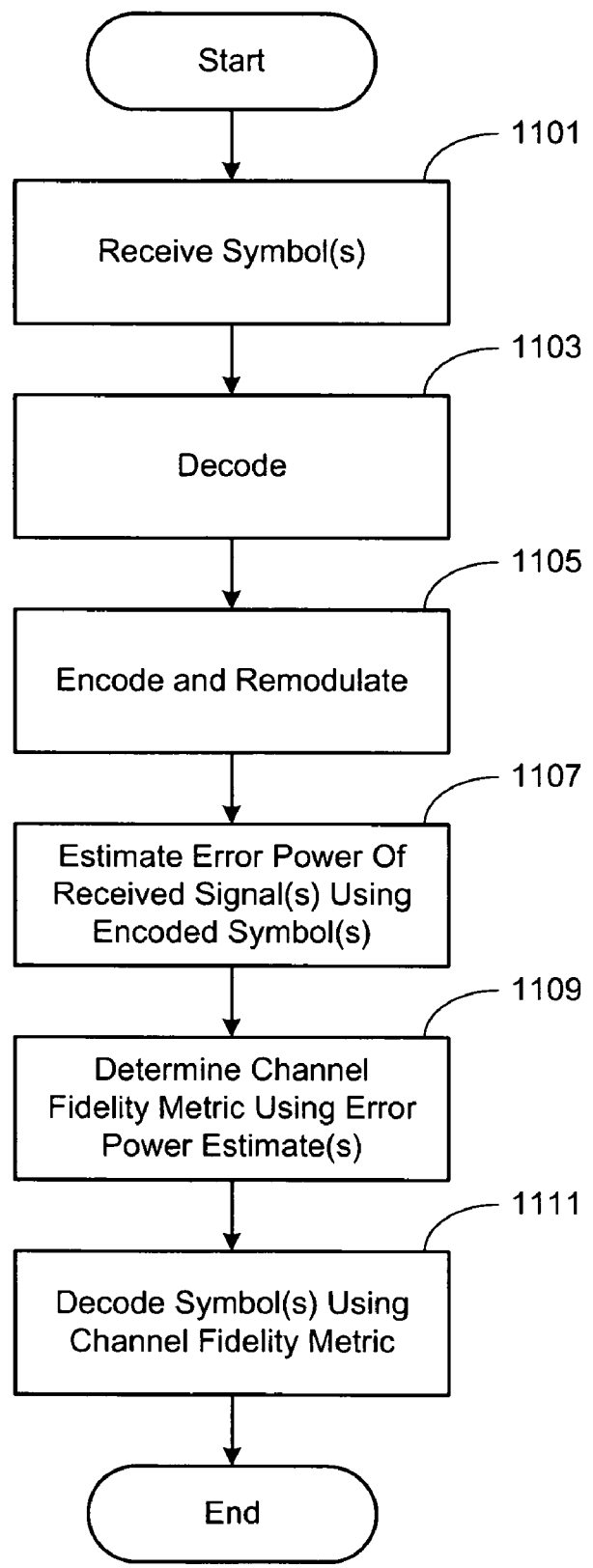
FIG. 11 illustrates a flow diagram illustrating one embodiment a method of impairment mitigation that may be employed using the system of FIG. 10 in accordance with one embodiment of the present invention.

FIG. 11 illustrates a flow diagram depicting one embodiment of a method of impairment mitigation that may be employed using the system of FIG. 10, for example. One or more symbols are received as illustrated by block 1101, are decoded as illustrated by block 1103 and then encoded and remodulated (for example by multiplying by the spreading signal for each of the symbols) as illustrated by block 1105. The error power of the received signal(s) is then estimated using the encoded symbol(s) as illustrated by block 1107. A channel fidelity metric is then determined using the error power estimate(s) as illustrated by block 1109, and the symbol(s) are decoded using the channel fidelity metric determined as illustrated by block 1111. If at block 1103 it is determined that particular received symbol(s) cannot be decoded and thus re-encoded, then those particular symbols are simply erased for estimation of error, for example.

As may be understood upon reviewing FIGS. 10 and 11, the system of FIG. 10 and method of FIG. 11 determine a fidelity metric after an initial decoding, and use it to perform a subsequent decoding. Multiple iterations of this process may be beneficial in some embodiments.

Based on the above, various embodiments of the present invention provide means for characterizing the transitory nature of the impairments (i.e., to develop knowledge) characterizing not just typical or even average levels of an impairment, but an understanding and characterization of the dynamic behavior of the impairment. With this knowledge, it is possible to facilitate improved communications in the channel, either by adjusting the transmission signal design, or by altering or adjusting the receiver processing, or both.

If the dynamic nature of the impairments is so rapid that it transitions from benign to severe and back to benign again, faster than the receiver can determine and communicate this degradation back to the original transmitter in the channel, then any adjustments in the transmission waveform are "permanent," in the sense that adaptation to the temporarily degraded channel is precluded by the dynamics. Still, the optimal transmission waveform may be different if and when it is learned that the channel contains some severe but transitory impairment(s). Thus, it benefits the communications system to learn and characterize the transitory nature of the impairments, leading to a superior transmit waveform with this new knowledge.

While some situations may preclude the feedback and adjustment of the transmit waveform for adapting to a temporary increase of an impairment, in such situations, the receiver may still benefit from this knowledge.

The present invention also includes alternate embodiments for detecting impacted chips (symbols, waveforms, etc.). One embodiment of the present invention relates to some kind of distortion inducing mechanism (a duration of one up to several chips), which introduces a brief, temporary distortion during the operation of a communication system similar to that described previously. This embodiment uses 128 chips to send a multiplicity of symbols simultaneously during a fraction of that frame. If the communication is subjected to a brief, temporary distortion, noise for example, the suspect (disturbed) chips are identified and blanked.

However, blanking the chip may affect the orthogonal spreading codes, such that they are no longer orthogonal. For example, if six chips are blanked out, then processing the remaining 120 of the 128 chips does not result in a zero value for the suspect chips unless the six blanked chips included three agreements and three disagreements (an unlikely occurrence). More likely, the remaining un-blanked chips contain some remnants of the suspect chips, resulting in a correlation between virtually all of the codes, which may result in ICI.

Figure 12:
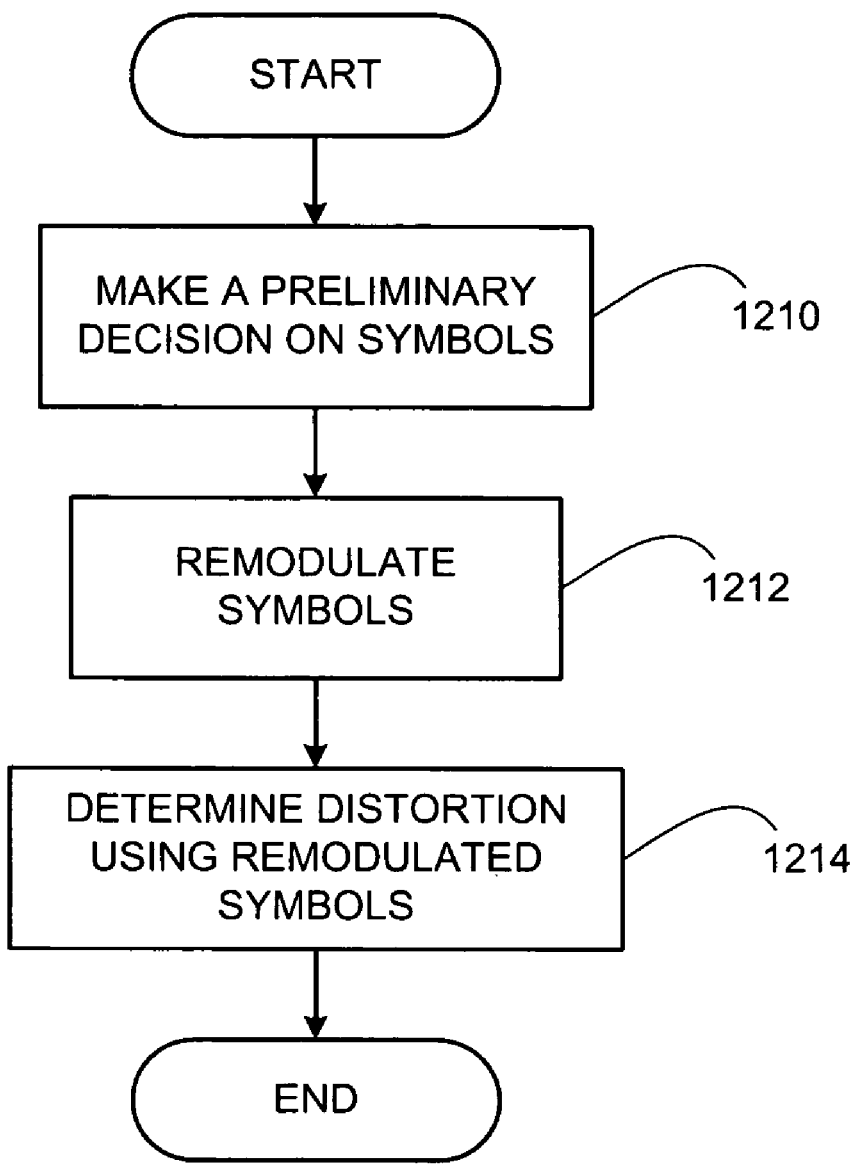
FIG. 12 illustrates a high-level flow diagram illustrating one embodiment of an alternate method of impairment mitigation that may be employed using a system similar to that illustrated in FIG. 10 in accordance with one embodiment of the present invention.

FIG. 12 illustrates a high level flow chart depicting a method for detecting impacted chips in accordance with one embodiment of the present invention. The illustrated method includes making a preliminary decision on at least one up to 128 chips, symbols, or waveforms transmitted in one spreading frame as illustrated by block 1210. These chips are then remodulated, in one embodiment using spreading codes, as illustrated by block 1212. Then, a determination of the distortion or noise may be made at each chip position, between the remodulated waveform and the received waveform as illustrated by block 1214. One or more of the techniques provided previously may be applied to this distortion embodiment. In one embodiment, these techniques may be applied repeatedly. In other words, this process may be repeated for multiple iterations.

Figure 13A:
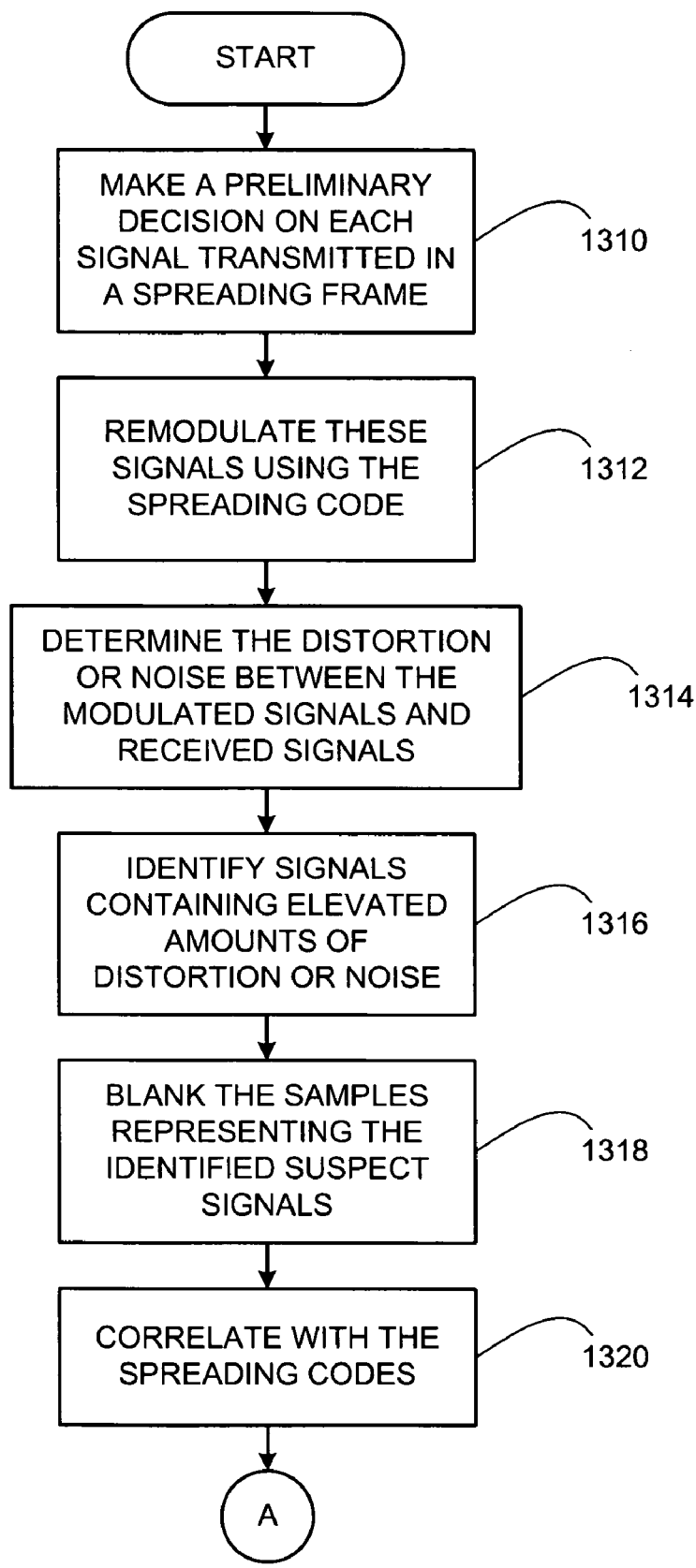
FIGS. 13A & 13B illustrate a flow diagram illustrate an alternate embodiment of a method of impairment mitigation similar to that illustrated in FIG. 12 that may be employed using a system similar to that illustrated in FIG. 10 in accordance with one embodiment of the present invention.
Figure 13B:
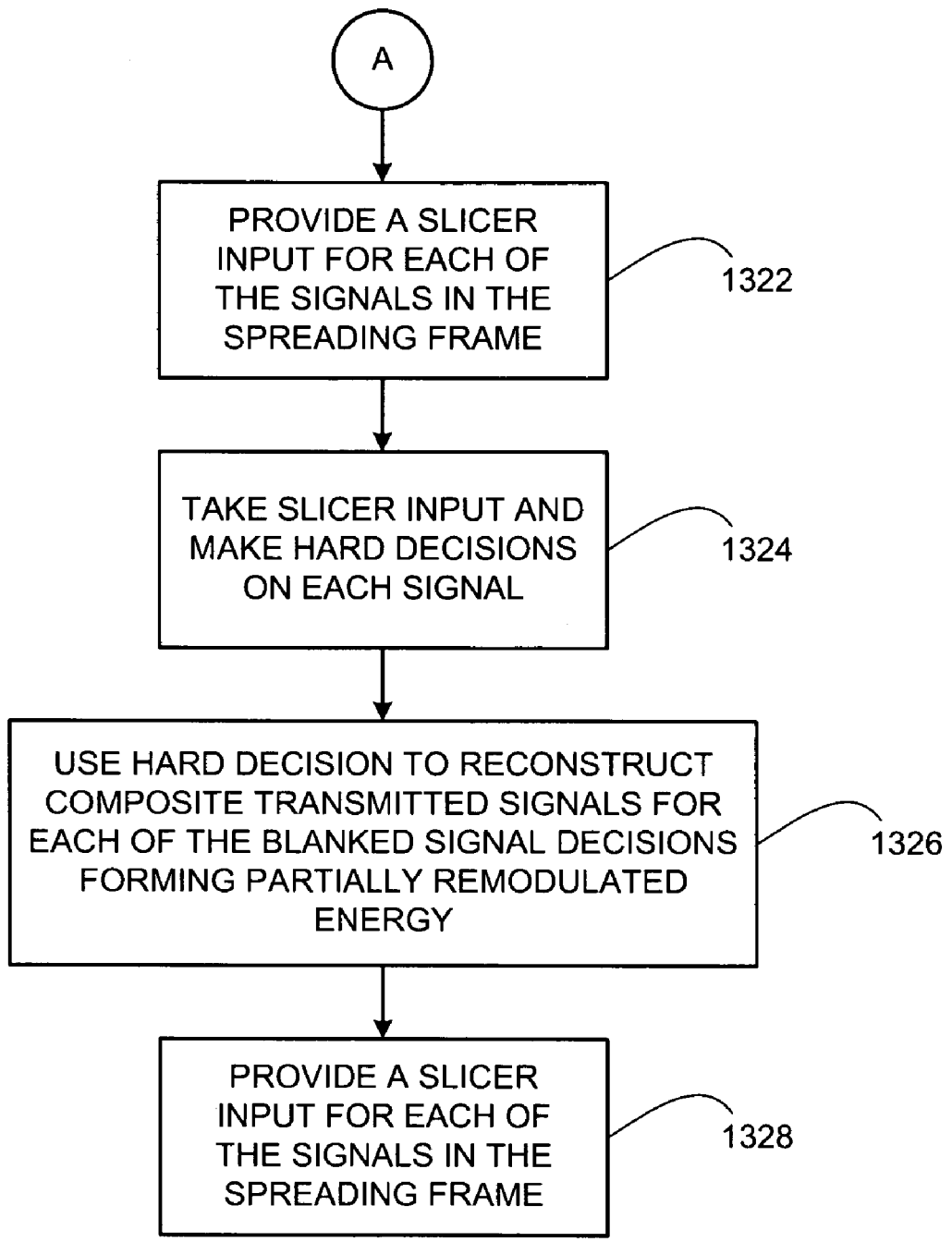

FIGS. 13A & 13B illustrate a detailed flow chart depicting an alternate method for detecting impacted signals (similar to that illustrated in FIG. 12) in accordance with one embodiment of the present invention. This method illustrated in FIG. 13 includes making a preliminary decision on each signal (for example, chips, symbols, waveforms, etc.) transmitted in at least one spreading frame as illustrated by block 1310. Such preliminary decisions may include blanking the suspect chips using burst noise detection as provided above or may include using raw received signal.

These signals are remodulated using spreading codes as illustrated by block 1312. Remodulating the signals may include putting the signals through a mass filter and taking the slicer outputs. A determination regarding the distortion or noise is made between the remodulated signal and the received signal regarding each signal as illustrated by block 1314. Such determination may include taking the missing signals, wiping them off and recreating them. Further, one or more of the techniques provided previously may be re-applied to such distortion estimate. This process may be repeated for multiple iterations. At the end of one or more passes or iterations, a set of signals (chips, symbols, waveforms, etc.) may be identified as containing or being suspected of containing elevated amounts of distortion and/or noise as illustrated by block 1316.

The illustrated method continues, blanking the samples that represent the identified suspect signals as illustrated by block 1318. In this embodiment blanking means are used to set the received signal to a value of zero for the identified suspect signals. The signals are correlated with the spreading code as illustrated by block 1320, providing an input to one or more slicers for each of the symbols in the spreading frame (128 symbols for example) as illustrated by block 1322. In one embodiment, these slicer inputs (alternatively referred to as "blanked slicer inputs") may be corrupted due to the intercode interference or ICI introduced into the inputs by blanking the one or more signals. It is contemplated that the set of spreading codes are orthogonal (thus having zero ICI) only when at least one but up to all 128 signals are correlated.

A hard decision is made on each signal using at least one but up to 128 of the slicer inputs as illustrated by block 1324, even though such slicer inputs may contain ICI due to blanking. Such hard decisions are then used in a Partial Remodulator (alternatively referred to as "PRM") wherein the composite transmitted value is reconstructed for each of the blanked signals, forming Partially Remodulated Energy (alternatively referred to as "PRME") as illustrated by block 1326. In one embodiment, this assumes that such hard decisions are the actual transmitted signals. The PRME is correlated with the blanked positions or signals for each of the spreading codes, and at least one but up to 128 partial correlation results (alternatively referred to as "Partial Correlation Results" or "PRCs") are added to the previously obtained blanked slicer inputs as illustrated by block 1328. This new set of at least one but up to 128 slicer inputs (alternatively referred to as "First Iteration Blanking-Repaired" or "$1^{st}$ IBR" slicer inputs, is then "hard decisioned." This blanking-repaired set of decisions may be used as the receiver hard decisions. However, in another embodiment the process may continue with at least one more iteration.

In a second iteration, the hard decisions from the $1^{st}$ IBR slicer inputs are used in the PRM and the resulting PRME is correlated with the blanked positions or signals. This set of at least one but up to 128 partial correlation results (alternatively referred to as "$2^{nd}$ PRCs") is added to the blanked slicer inputs. In one embodiment, the $2^{nd}$ PRCs are added to the original blanked slicer inputs. This addition results in at least one but up to 128 new slicer inputs (alternatively referred to as the "2nd IBR slicer inputs"). These are 2nd IBR slicer inputs are "hard decisioned." These latest hard decisions may be the final hard decisions, or another iteration may be performed.

In subsequent iterations, the hard decisions from the Nth IBR slicer inputs are again passed to the PRM, and the resulting PRME is correlated with the blanked signals or chip positions, yielding N+$1^{st}$ PRCs. In one embodiment, the N+$1^{st}$ PRCs are added to the original blanked slicer inputs, producing N+$1^{st}$ IBR slicer inputs. Such N+$1^{st}$ IBR slicer inputs may again be "hard decisioned." This blanking-repaired set of decisions may again be used as the receiver hard decisions.

The process may, in one embodiment, continue for a specific set of iterations (one or two iterations for example), or end when stability is reached. In one or more embodiments of the present invention, stability is defined as reaching the same hard decisions in two successive iterations; however other ending criteria are contemplated. It is also possible to execute one or more of the previously described iterations and use such hard decisions as feedback to a burst noise estimator (not shown). Such burst noise estimator may used to refine the estimate of which signals or chips were indeed impacted by increased distortion/noise. Then the iterative processing may start anew, with new blanked signals, chip positions, or waveforms.

As provided previously, one embodiment of the present invention relates to a mitigation process using orthogonal decomposition of individual chips, signals, waveforms, etc. It is contemplated that this invention may be applicable to any set of orthogonal waveforms spanning the time-frequency signal space. In such an embodiments, the received waveform is decomposed into the various components of the new basis set. Any distorted or noisy dimensions are estimated (similar to that provided previously using a "dimension component" replacing the chips for example). These distorted/noisy dimensions are blanked, and the time-domain waveforms regenerated but without such distorted/noisy dimensions. The time-domain waveforms are correlated with each of the spreading codes, providing the blanked slicer inputs. The PRM takes the hard decisions using such blanked slicer inputs, computing the PRME needed to be reintroduced due to the elimination of some of the signal space dimensions. The iterations continue just as above, except in this embodiment the transfer from chip samples to the desired basis set and back again must be included in the processing.

Figure 14:
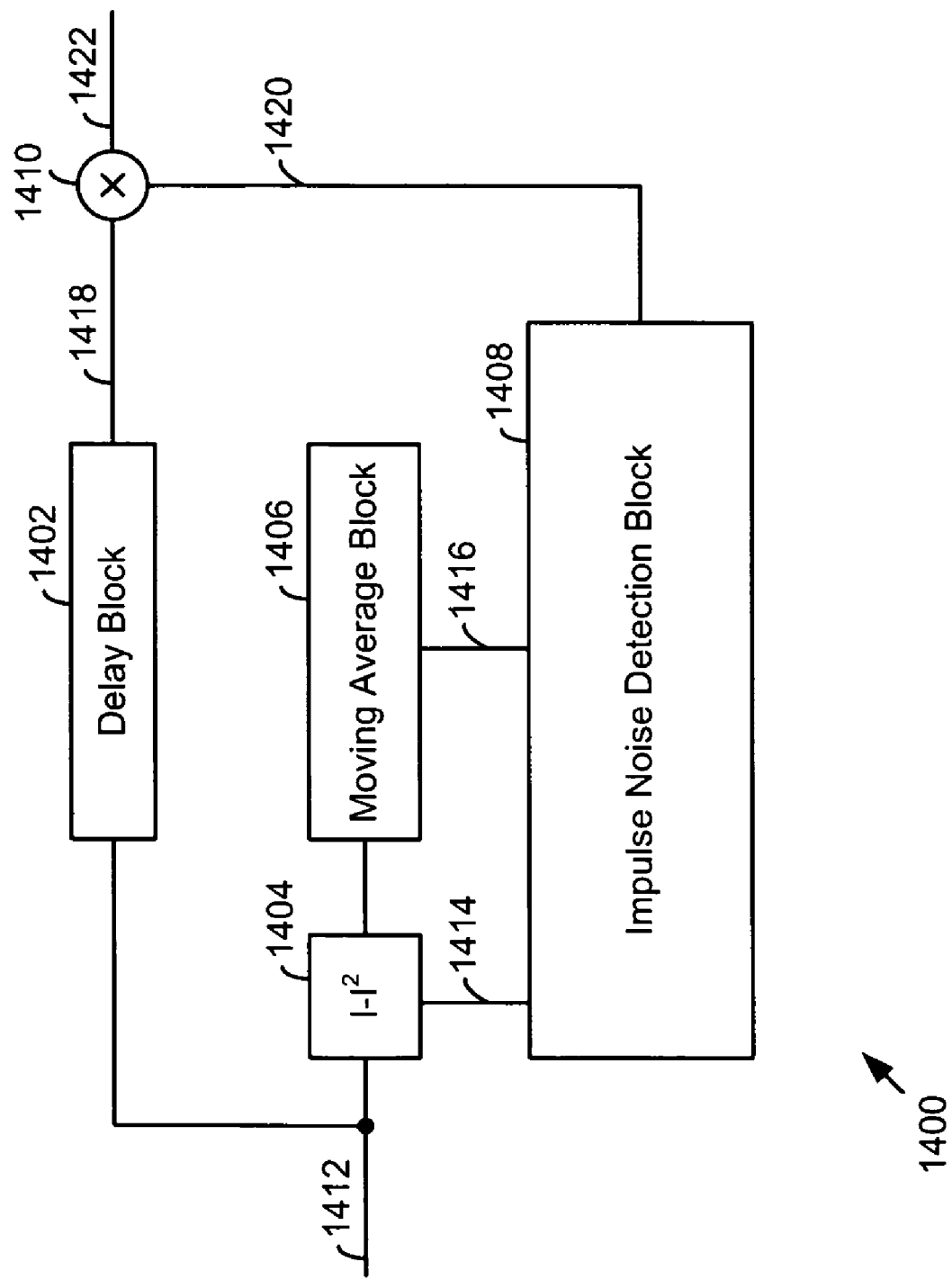
FIG. 14 is a block diagram illustrating a system for mitigating impairment in a communication system constructed according to the present invention.

FIG. 14 is a block diagram illustrating a system 1400 for mitigating impairment in a communication system constructed according to the present invention. The system 1400 of FIG. 14 includes a delay block 1402, a signal level block 1404, a moving average window block 1406, an impulse noise detection block 1408, and a combiner 1410. The delay block 1402 is operable to receive and delay each chip 1412 of a plurality of chips in a spreading interval. The signal level block 1404 is operable to determine a signal level 1414 of each chip 1412 of the plurality of chips in the spreading interval. The moving average window block 1406 communicatively couples to the signal level block 1404 and is operable to determine a composite signal level 1416 for a chip window corresponding to the chip. The chip sequence may correspond to a 128 chip-spreading interval of a SCDMA system, for example. As will be further described with reference to FIG. 15, for example, the chip window may correspond to five chips or another number of chips and is analogous to element 205 in FIG. 2 and element 609 in FIG. 9. The number of chips of the chip window may be related to the expected duration of impulse noise, the number of chips of the spreading interval, or to another consideration. The collection of signal 1414, moving average block 1406, and the impulse noise detection block 1408 comprise a particular embodiment of the fidelity processor (elements 207, 611, and 1013 in the preceding FIGS. 2, 6, and 10, respectively).

The impulse noise detection block 1408 communicatively couples to the signal level block 1404 and to the moving average window block 1406. The impulse noise detection block 1408 is operable to receive the signal level 1414 of each chip 1412 of the plurality of chips in the spreading interval and to receive the composite signal level 1416 corresponding to each chip 1412 of the plurality of chips. The impulse noise detection block 1408 is further operable to produce an erasure indication 1420 for each chip of the plurality of chips of the corresponding chip window. This is a particular embodiment of the "Channel OK" or "Channel Degraded" decision indicated in FIG. 6. This is also a particular embodiment of block 1316 in the flow diagram of FIG. 13A. The combiner 1410 communicatively couples to the delay block 1402 and to the impulse noise detection block 1408 and is operable to erase chips of the plurality of chips in the spreading interval based upon the erasure indication. Note, for purposes of clarity, the erasure of chips by multiplying with signal 1420 is a particular embodiment of step 1318 in the flow chart of FIG. 13A. The delay block 1402 is used to time align the erasure indication 1420.

The erasure indication 1420 of FIG. 14, in conjunction with the combiner 1410 is shown as used to either erase or keep each delayed chip 1418 received from the delay block 1402. In alternate embodiments, the erasure indication 1420 may be provided directly to a decoder, similarly to the manner in which the channel fidelity metric is used as illustrated in and described with reference to a FIGS. 2, 6, and 10.

Figure 15:
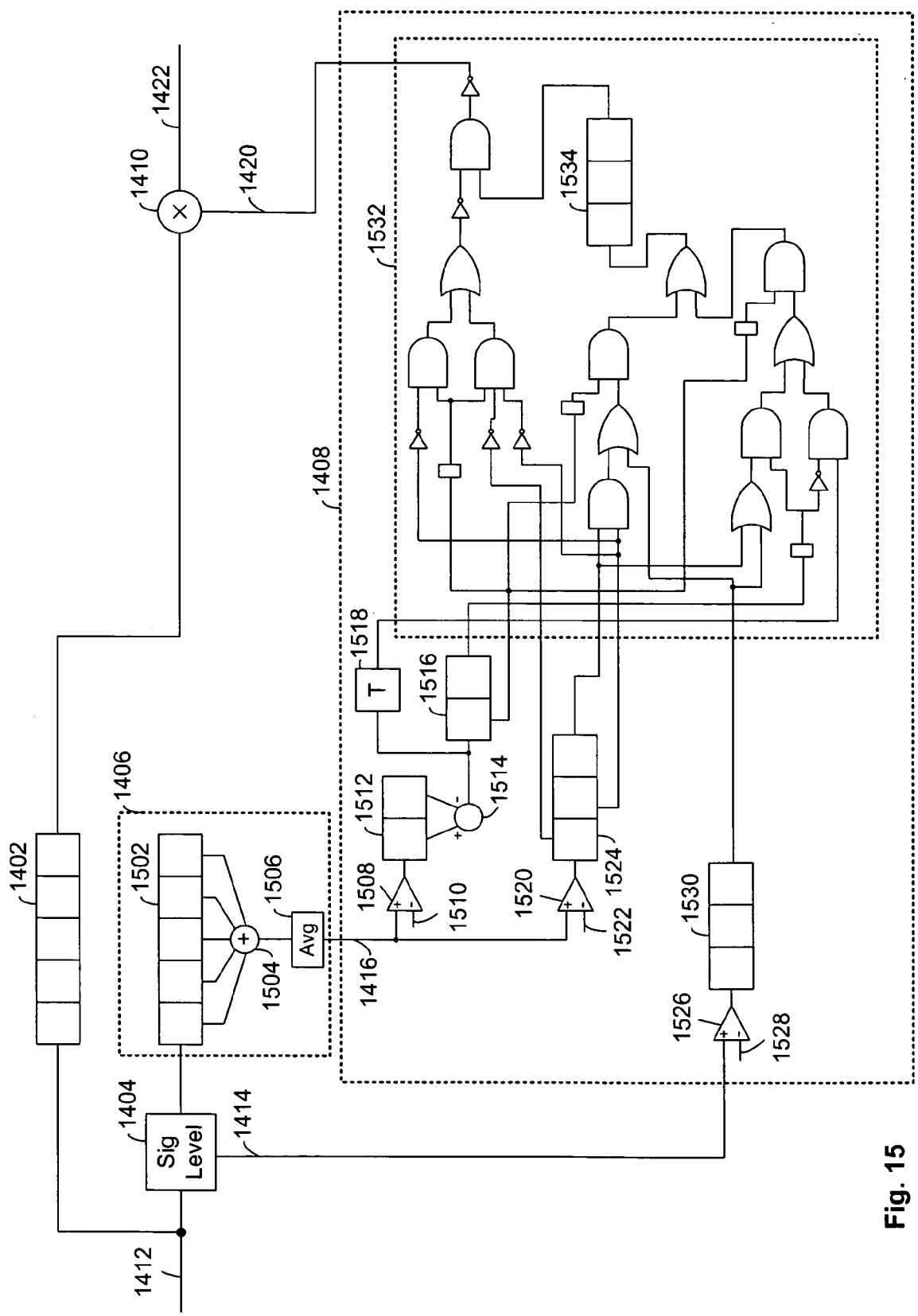
FIG. 15 is a schematic diagram illustrating one particular embodiment of the system for mitigating impairment in a communication system illustrated in FIG. 15.

FIG. 15 is a schematic diagram illustrating one particular embodiment of the system for mitigating impairment in a communication system illustrated in FIG. 15. The moving average block 1406 includes a five-element shift register 1502, a summation component 1504, and an averaging component 1506. The five-element shift register 1502 provides five chip intervals of delay for the plurality of chips of the spreading interval. Note that a seven-element tap delay line 609 is shown in FIG. 6; the exact number of taps or elements in this window selection may be generalized. The number of taps may even vary over time within an embodiment, perhaps based on determinations derived within the fidelity processor and feedback. The output of the averaging component 1506 is the composite signal level 1416 produced to the impulse noise detection block.

The impulse noise detection block 1408 includes comparators 1508, 1520, and 1526. Comparator 1526 compares the signal level of the chip 1414 to a first threshold 1528 to produce a first result. The first result inputs to shift register 1530, which provides a three-chip shift delay operation. A second comparator 1520 compares the composite signal level 1416 of the plurality of chips of the chip window to a second threshold 1522 to produce a second comparison result. The second comparison result is received into three-element shift register 1524. A third comparator 1508 compares the composite signal level 1416 of the plurality of chips of the corresponding chip window to a third threshold 1510 to produce a third comparison result. The output of comparator 1508 is received by shift register 1512, which compares the third comparison results of adjacent chips. A summation element 1514 having positive and negative inputs from the shift register 1512 produces a fourth comparison result based upon third comparison results of adjacent chips. This fourth comparison result is received by shift register 1516, which has two delay elements. Further, element 1518 receives the fourth comparison result and produces an output based upon the fourth comparison result. The output of element 1518 and shift registers 1516, 1524, and 1530 is received by combinational logic and shift register block 1532. This block 1532 includes a plurality of logic gates and a shift register 1534 and produces as its output the erasure indication 1420 to combiner 1410. The combiner 1410 also receives the output of the delay block 1402 and produces its output 1422 based upon these two inputs.

Figure 16:
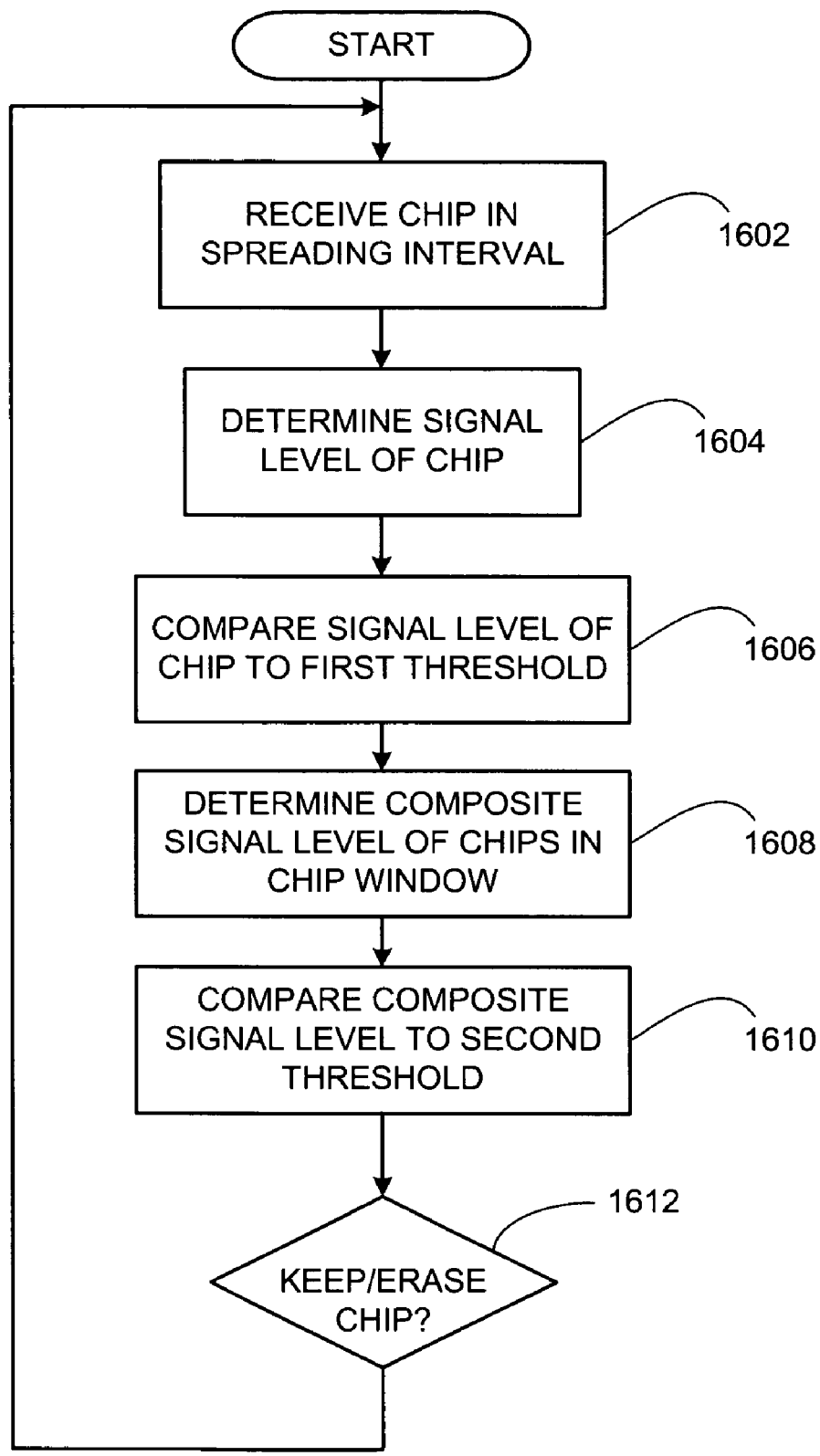
FIG. 16 is a flow diagram illustrating operation according to a first embodiment of the present invention for mitigating impairment in a communication system.

FIG. 16 is a flow diagram illustrating operation according to a first embodiment of the present invention for mitigating impairment in a communication system. As shown in FIG. 16, operation commences in receiving a plurality of chips in a spreading interval (step 1602). Each chip is considered separately in the operation of FIG. 16. As a first operation for each chip in the spreading interval, the signal level of the chip is determined (step 1604). As was previously described, this chip level is determined in one embodiment by magnitude-squaring a measured level of the chip. Because most chips have complex components, and are spread by either a 1 or −1 chip such summation is required so that a valid comparison between the signal level and a threshold and between the signal levels of adjacent chips can be made.

Operation continues in comparing the signal level of the chip to a first threshold to produce a first comparison result (step 1606). Then, operation continues by determining the composite signal level of a plurality of chips of a chip window of the spreading interval (step 1608). Next, operation continues with comparing the composite signal level of the plurality of chips of the chip window to a second threshold to produce a second comparison result (step 1610). Finally, the operation for the particular chip includes keeping or erasing the chip based upon the first comparison result and the second comparison result (step 1610). Operation from step 1612 returns to step 1602 where a next chip is considered. In keeping or erasing the chip based upon the first comparison result and the second comparison result at step 1612, operation may include passing the plurality of kept chips or erased chips to a coupled decoder, to a coupled despreader, or to a coupled combiner.

The operation at step 1606 may include magnitude-squaring a measured level of each chip of the plurality of chips of the chip window to produce a corresponding plurality of the signal levels.

The operation of step 1608 may include summing a corresponding plurality of signal levels to produce a signal level summation result and then averaging the signal level summation result to produce the composite signal level. This composite signal level is then compared to the second threshold at step 1608.

According to various embodiments of step 1612, the chip is erased when either the first comparison result or the second comparison result is unfavorable, the chip is erased only when both the first comparison result and the second comparison result are unfavorable, or based upon some other combination of the first comparison result on the second comparison result.

Figure 17:
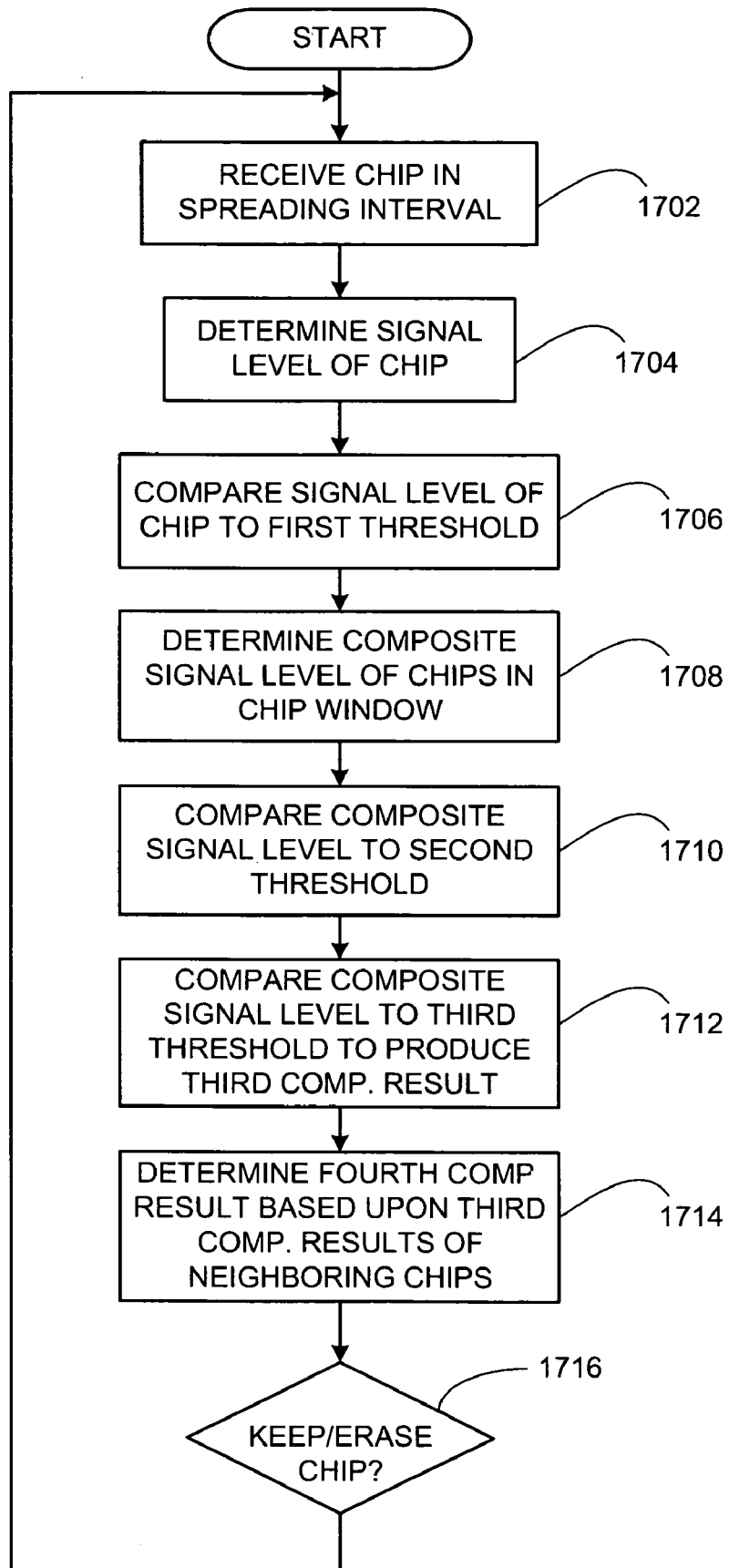
FIG. 17 is a flow diagram illustrating operation according to a second embodiment of the present invention for mitigating impairment in a communication system.

FIG. 17 is a flow diagram illustrating operation according to a second embodiment of the present invention for mitigating impairment in a communication system. The operations of steps 1702 through 1710 correspond to operations of steps 1602 through 1610 of FIG. 16 and are not separately described with reference to FIG. 17. However, additional operations in FIG. 17 include comparing the composite signal level of the plurality of chips of the corresponding chip window to a third threshold to produce a third comparison result (step 1712). Operations further include determining a fourth comparison result based upon the third comparison result of adjacent chips (step 1714). Then, the decision whether to keep or erase the chip is further based upon the fourth comparison result. Thus, the operation at step 1716 includes determining the erasure indication based upon the first comparison result, the second comparison result, and the fourth comparison result. The fourth comparison is based upon the third comparison results of adjacent chips so the third comparison results also factor into the decision at step 1716. From step 1716, operation returns to step 1702 for consideration of the next chip.

Figure 18:
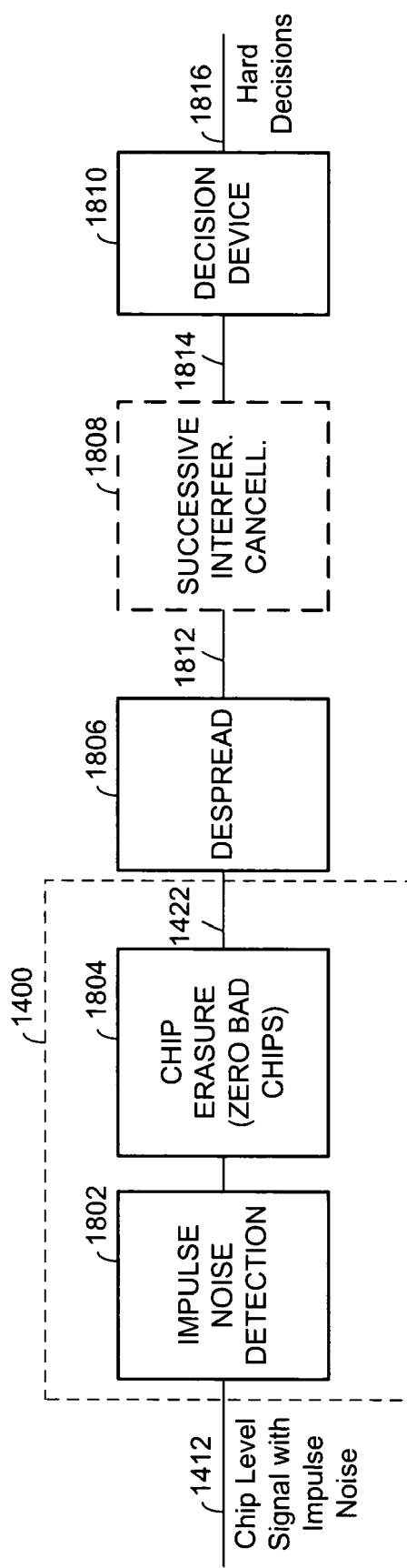
FIG. 18 is a block diagram illustrating the manner in which a system for mitigating impairment of a communication system may interface with other components of a communication system according to the present invention.

FIG. 18 is a block diagram illustrating the manner in which a system for mitigating impairment of a communication system may interface with other components of a communication system according to the present invention. As shown in FIG. 18, the system for mitigating impairment of communication system 1400 may be simplified to indicate its inclusion of impulse noise detection block 1802 and chip erasure block 1804. The impulse noise detection block 1802 receives the chip level signals impulse noise 1412 and the chip erasure block 1804 produces the kept or erased chip 1422.

The kept or erased chips 1422 are received by a despreader 1806, which despreads such chips across the spreading interval to produce a reconstructed symbol 1812. The reconstructed symbols 1812 may be received by a successive interference cancellation block 1808 that will further operate to remove interference or ingress noise from the received symbol or sequence of symbols. Examples of such successive interference cancellation devices were previously described with reference to FIG. 10 and are described further in co-pending application Ser. No. 10/242, 032 filed on Sep. 12, 2002, co-pending, having, and being incorporated herein by reference in its entirety. The operations performed by blocks 1802 and 1804 of block 1400 of FIG. 18 are the same/similar to/analogous to steps 1316 and 1318, respectively, of FIG. 13A. Block 1806 of FIG. 18 performs operations corresponding to those of step 1320 of FIG. 13A. The successive interference cancellation block 1808 of FIG. 18 performs operations same/similar to/analogous to the operations of the steps of FIG. 13B and those at the beginning of FIG. 13A. Successive interference cancellation block 1808 may also perform further iterations corresponding to the operations of FIGS. 13A and 13B. Another embodiment of a successive interference cancellation block is described with reference to FIG. 10. The successive interference cancellation block 1808 outputs soft symbol decisions 1814 having interference substantially removed. These soft symbol decisions 1812 are received by decision device 1810 and used to produce hard decisions 1816.

Many modifications and variations of the present invention are possible in light of the above teachings. Thus, it is to be understood that, within the scope of the appended claims, the invention may be practiced otherwise than as described hereinabove.

The invention claimed is:

1. A method for mitigating impairment in a communication system, the method comprising:
   receiving a plurality of chips in a spreading interval;
   for each chip of the spreading interval:
      determining a signal level of the chip;
      comparing the signal level of the chip to a first threshold to produce a first comparison result;
      determining a composite signal level of a plurality of chips of a chip window of the spreading interval; and
      comparing the composite signal level of the plurality of chips of the chip window to a second threshold to produce a second comparison result; and
   keeping or erasing the chip based upon the first comparison result and the second comparison result.

2. The method of claim 1, further comprising passing a plurality of kept chips and at least one blanked chip to a coupled decoder.

3. The method of claim 1, wherein determining the signal level of the chip comprises magnitude-squaring a measured level of the chip.

4. The method of claim 1, wherein determining the composite signal level of the plurality of chips of the chip window of the spreading interval comprises:
   magnitude-squaring a measured level of each chip of the plurality of chips of the chip window to produce a corresponding plurality of signal levels;
   summing the corresponding plurality of signal levels to produce a signal level summation result; and
   averaging the signal level summation result across the chip window to produce the composite signal level.

5. The method of claim 1, wherein the chip is erased when either the first comparison result or the second comparison result is unfavorable.

6. The method of claim 1, wherein the chip is erased only when both the first comparison result and the second comparison result are unfavorable.

7. The method of claim 1:
further comprising comparing the composite signal level of the plurality of chips of the corresponding chip window to a third threshold to produce a third comparison result;
further comprising determining a fourth comparison result based upon third comparison results of adjacent chips; and
wherein keeping or erasing the chip is further based upon the fourth comparison result.

8. The method of claim 7, wherein the fourth comparison result is indicative of a boundary of impulse noise affecting the plurality of chips in the spreading interval.

9. The method of claim 1, wherein keeping or erasing the chip based upon the first comparison result and the second comparison result further comprises considering first comparison results and second comparison results of neighboring chips.

10. The method of claim 1, further comprising delaying the plurality of chips in the spreading interval to allow for delay in completing the keeping or erasing operations.

11. A system for mitigating impairment in a communication system comprising:
a delay block operable to receive and delay each chip of a plurality of chips in a spreading interval;
a signal level block operable to determine a signal level of each chip of the plurality of chips in the spreading interval;
a moving average window block communicatively coupled to the signal level block and operable to determine a composite signal level for a chip window corresponding to the chip;
an impulse noise detection block communicatively coupled to the signal level block and to the moving average window block, operable to receive the signal level of each chip of the plurality of chips in the spreading interval, operable to receive the composite signal level corresponding to each chip of the plurality of chips, and operable to produce an erasure indication for each chip of the plurality of chips of the corresponding chip window; and
a combiner communicatively coupled to the delay block and to the impulse noise detection block and operable to keep or erase chips of the plurality of chips in the spreading interval based upon the erasure indication.

12. The system of claim 11, further comprising decoder coupling operable to pass a plurality of kept chips and at least one blanked chip to a coupled decoder.

13. The system of claim 11, wherein determining the signal level of the chip comprises magnitude-squaring a measured level of the chip.

14. The system of claim 11, wherein the moving average window block is operable to determine the composite signal level for a chip window corresponding to the chip by:
magnitude-squaring a measured level of each chip of the plurality of chips of the chip window to produce a corresponding plurality of signal levels;
summing the corresponding plurality of signal levels to produce a signal level summation result; and
averaging the signal level summation result across the chip window to produce the composite signal level.

15. The system of claim 11, wherein the impulse noise detection block is operable to, for each chip of the plurality of chips:
compare the signal level of the chip to a first threshold to produce a first comparison result;
compare the composite signal level corresponding to the chip to a second threshold to produce a second comparison result; and
produce the erasure indication based upon the first comparison result and the second comparison result.

16. The system of claim 15, wherein the impulse noise detection block is operable to erase the chip when either the first comparison result or the second comparison result is unfavorable.

17. The system of claim 15, wherein the impulse noise detection block is operable to erase the chip only when both the first comparison result and the second comparison result are unfavorable.

18. The system of claim 15, wherein the impulse noise detection block is further operable to:
compare the composite signal level of the plurality of chips of the corresponding chip window to a third threshold to produce a third comparison result;
determine a fourth comparison result based upon third comparison results of adjacent chips; and
produce the erasure indication based upon the fourth comparison result.

19. The system of claim 18, wherein the fourth comparison result is indicative of a boundary of impulse noise affecting the plurality of chips in the spreading interval.

20. The system of claim 11, further comprising producing the erasure indication by considering first comparison results and second comparison results of neighboring chips.

21. The system of claim 11, wherein the delay block is operable to delay the plurality of chips in the spreading interval to allow the impulse noise detection block to produce the erasure indication.

22. A method for mitigating impairment in a communication system, the method comprising:
receiving a plurality of chips in a spreading interval;
for each chip of the spreading interval:
determining a signal level of the chip;
comparing the signal level of the chip to a first threshold to produce a first comparison result;
determining a composite signal level of a plurality of chips of a chip window of the spreading interval; and
comparing the composite signal level of the plurality of chips of the chip window to a second threshold to produce a second comparison result;
comparing the composite signal level of the plurality of chips of the corresponding chip window to a third threshold to produce a third comparison result; and
determining a fourth comparison result based upon third comparison results of adjacent chips; and
keeping or erasing the chip based upon the first comparison result, the second comparison result, and the fourth comparison result.

23. The method of claim 22, wherein determining the composite signal level of the plurality of chips of the chip window of the spreading interval comprises:
magnitude-squaring a measured level of each chip of the plurality of chips of the chip window to produce a corresponding plurality of signal levels;
summing the corresponding plurality of signal levels to produce a signal level summation result; and
averaging the signal level summation result across the chip window to produce the composite signal level.

24. The method of claim 22, wherein the fourth comparison result is indicative of a boundary of impulse noise affecting the plurality of chips in the spreading interval.

* * * * *